US011611809B2

(12) United States Patent
Liu

(10) Patent No.: US 11,611,809 B2
(45) Date of Patent: Mar. 21, 2023

(54) VIDEO PROCESSING METHOD AND APPARATUS, AND STORAGE MEDIUM

(71) Applicant: TENCENT TECHNOLOGY (SHENZHEN) COMPANY LIMITED, Shenzhen (CN)

(72) Inventor: Yujie Liu, Shenzhen (CN)

(73) Assignee: TENCENT TECHNOLOGY (SHENZHEN) COMPANY LIMITED, Guangdong (CN)

(*) Notice: Subject to any disclaimer, the term of this patent is extended or adjusted under 35 U.S.C. 154(b) by 501 days.

(21) Appl. No.: 16/937,360

(22) Filed: Jul. 23, 2020

(65) Prior Publication Data

US 2020/0356782 A1    Nov. 12, 2020

Related U.S. Application Data

(63) Continuation of application No. PCT/CN2019/085606, filed on May 6, 2019.

(30) Foreign Application Priority Data

Jun. 15, 2018  (CN) .......................... 201810618681.6

(51) Int. Cl.
H04N 21/84      (2011.01)
H04N 21/4788   (2011.01)
(Continued)

(52) U.S. Cl.
CPC ......... *H04N 21/84* (2013.01); *G06F 18/2431* (2023.01); *G06V 10/235* (2022.01);
(Continued)

(58) Field of Classification Search
None
See application file for complete search history.

(56) References Cited

U.S. PATENT DOCUMENTS

2012/0166922 A1    6/2012  Rolles
2019/0377956 A1*  12/2019  Zheng ................... G06V 20/40

FOREIGN PATENT DOCUMENTS

CN    105095378 A    11/2015
CN    106060672 A    10/2016
(Continued)

OTHER PUBLICATIONS

Communication pursuant to Rules 70(2) and 70a(2) EPC dated Apr. 20, 2021 and Extended Search Report of European Application 19819568.7 dated Mar. 31, 2021, 9 pages.

(Continued)

Primary Examiner — Leon Flores
(74) Attorney, Agent, or Firm — Crowell & Moring, L.L.P.

(57) ABSTRACT

Embodiments of this application disclose a video processing method. The method may include: obtaining bullet comment data corresponding to a video data; obtaining keyword information entry matching the bullet comment data from a key information library as target keyword information entry, the key information library comprising keyword information entries and classification recognition models of target objects respectively corresponding to each of the keyword information entries; obtaining a target video frame from a plurality of video frames of the video data; recognizing an image region of a target object corresponding to the target keyword information entry in the target video frame based on a classification recognition model of the target object; determining the recognized image region as a target region;

(Continued)

and performing animation processing on the target region in the target video frame in response to the target video frame in the video data being played.

19 Claims, 11 Drawing Sheets

(51) Int. Cl.
*G06V 20/40* (2022.01)
*G06F 18/2431* (2023.01)
*G06V 10/82* (2022.01)
*G06V 10/22* (2022.01)
*G06V 20/10* (2022.01)
*G06V 10/25* (2022.01)
*G06V 10/20* (2022.01)

(52) U.S. Cl.
CPC .............. *G06V 10/82* (2022.01); *G06V 20/10* (2022.01); *G06V 20/41* (2022.01); *G06V 20/46* (2022.01); *H04N 21/4788* (2013.01); *G06V 10/25* (2022.01); *G06V 10/255* (2022.01)

(56) References Cited

FOREIGN PATENT DOCUMENTS

| | | |
|---|---|---|
| CN | 106101747 A | 11/2016 |
| CN | 106156237 A | 11/2016 |
| CN | 106909548 A | 6/2017 |
| CN | 106921891 A | 7/2017 |
| CN | 107690078 A | 2/2018 |
| CN | 107948708 A | 4/2018 |
| CN | 108108353 A | 6/2018 |
| EP | 3316586 A1 | 5/2018 |
| JP | 2006129122 A | 5/2006 |

OTHER PUBLICATIONS

International Search Report for PCT Patent Application No. PCT/CN2019/085606.
Office Action and Search Report of Chinese Application 2018106186816, dated Mar. 26, 2021, 8 pages.

* cited by examiner

VIDEO PROCESSING METHOD AND APPARATUS, AND STORAGE MEDIUM

RELATED APPLICATION

This application is a continuation application of PCT Patent Application No. PCT/CN2019/085606, filed on May 6, 2019, which claims priority to Chinese Patent Application No. 201810618681.6, entitled "VIDEO PROCESSING METHOD AND APPARATUS" filed with the National Intellectual Property Administration, PRC on Jun. 15, 2018, wherein the entirety of each of the above-referenced applications is incorporated by reference in its entirety.

FIELD OF THE TECHNOLOGY

This application relates to the field of Internet technologies, and in particular, to a video processing method and apparatus, and a storage medium.

BACKGROUND OF THE DISCLOSURE

When watching a video through a client terminal or a web page, a user usually enables a bullet comment function, to view bullet comments published by other users. Because in some videos, a quantity of bullet comments is relatively large or a playback speed of the bullet comments is relatively high, the user cannot timely and clearly identify key content of the bullet comments on a video playback interface (that is, it is difficult to capture keyword information entry in the bullet comments timely) during a process of playing the bullet comments. Consequently, bullet comment data is less identifiable, and even a visual display effect of the bullet comment data is degraded.

In addition, because the bullet comments on the video playback interface are independent of played video content, the bullet comments displayed on the video playback interface cannot provide feedback to the currently played video content in real time, that is, there is a lack of a correlation between the bullet comments in the client terminal and the video content. Consequently, a visual display effect of currently displayed bullet comment data is degraded.

SUMMARY

An embodiment of this application provides a video processing method, performed by a client terminal, the method including:

obtaining bullet comment data corresponding to a video data;

obtaining keyword information entry matching the bullet comment data from a key information library as target keyword information entry, the key information library comprising keyword information entries and classification recognition models of target objects respectively corresponding to each of the keyword information entries;

obtaining a target video frame from a plurality of video frames of the video data;

recognizing an image region of a target object corresponding to the target keyword information entry in the target video frame based on a classification recognition model of the target object;

determining the recognized image region as a target region; and performing animation processing on the target region in the target video frame in response to the target video frame in the video data being played.

An embodiment of this application provides a video processing apparatus, including a memory operable to store program code and a processor operable to read the program code. The processor is configured to:

obtain bullet comment data corresponding to a video data;

obtain keyword information entry matching the bullet comment data from a key information library as target keyword information entry, the key information library comprising keyword information entry and classification recognition models of target objects respectively corresponding to each of the keyword information entries;

obtain a target video frame from a plurality of video frames of the video data;

recognize an image region of a target object corresponding to the target keyword information entry in the target video frame based on a classification recognition model of the target object;

determine the recognized image region as a target region; and perform animation processing on the target region in the target video frame in response to the target video frame in the video data being played.

An embodiment of this application provides a video processing apparatus, including: a processor and a memory, the processor being connected to the memory, the memory being configured to store program code, and the processor being configured to invoke the program code to perform the video processing method provided in the embodiments of this application.

An embodiment of this application provides a non-transitory machine-readable media, having instructions stored on the machine readable media, the instructions configured to, when executed, cause a machine to:

obtain bullet comment data corresponding to a video data;

obtain keyword information entry matching the bullet comment data from a key information library as target keyword information entry, the key information library comprising keyword information entry and classification recognition models of target objects respectively corresponding to each of the keyword information entries;

obtain a target video frame from a plurality of video frames of the video data;

recognize an image region of a target object corresponding to the target keyword information entry in the target video frame based on a classification recognition model of the target object;

determine the recognized image region as a target region; and perform animation processing on the target region in the target video frame in response to the target video frame in the video data being played.

BRIEF DESCRIPTION OF THE DRAWINGS

To describe the technical solutions in the embodiments of this application or the related art more clearly, the following briefly describes the accompanying drawings required for describing the embodiments or the related art. Apparently, the accompanying drawings in the following description show merely some embodiments of this application, and a person of ordinary skill in the art may derive other drawings from the accompanying drawings without creative efforts.

DESCRIPTION OF EMBODIMENTS

The following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

An embodiment of this application provides a video processing method, to enrich a visual display effect of bullet comment data, and avoid waste of device resources and network resources caused by recognizing and capturing the bullet comment data. As an example, the bullet comments may be one-line comment texts or other indicia contributed by viewers that float directly above the video the viewers are watching.

Figure 1:
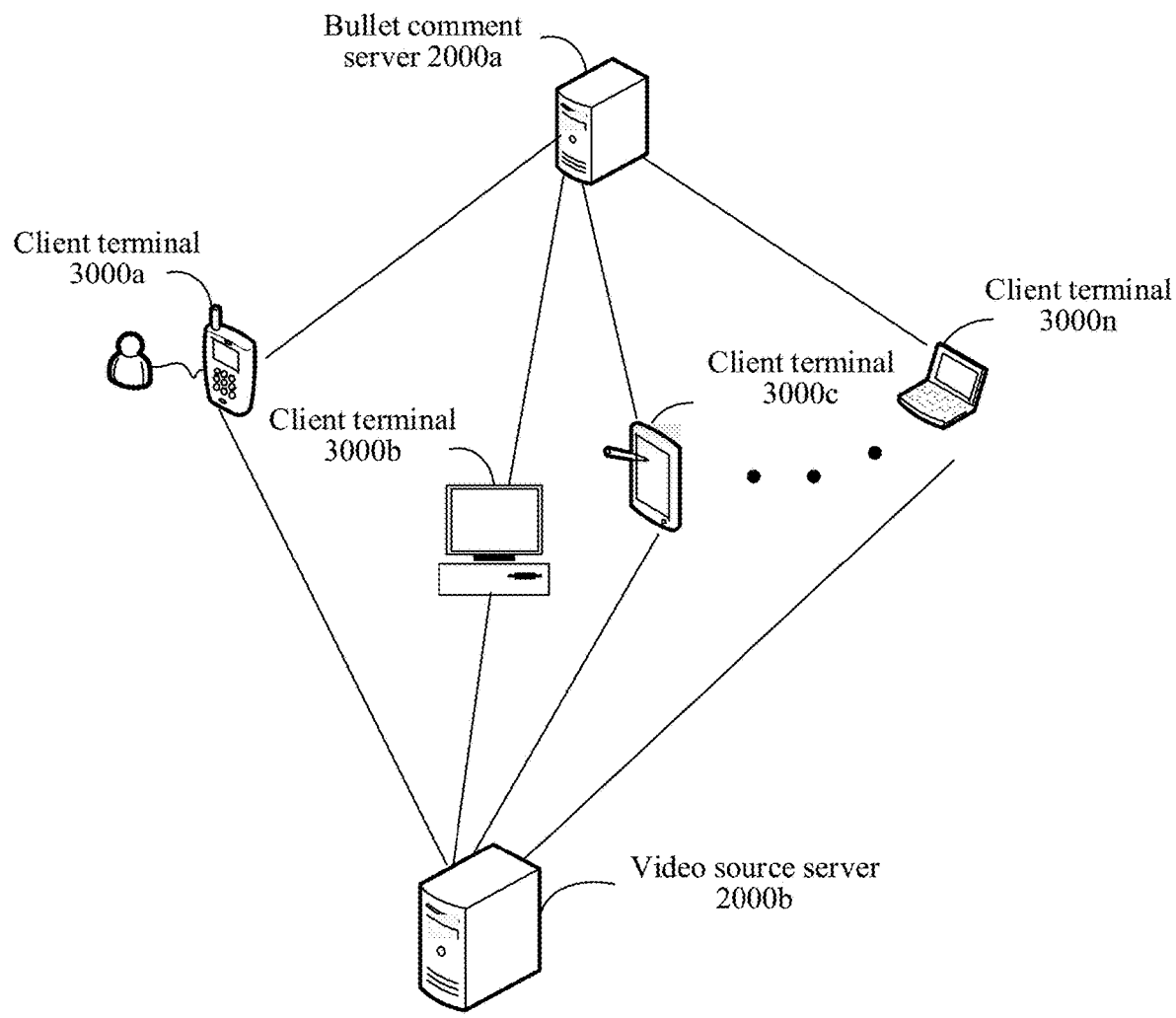
FIG. 1 is a schematic structural diagram of a network architecture according to an embodiment of this application.

FIG. 1 is a schematic structural diagram of a network architecture according to an embodiment of this application. As shown in FIG. 1, the network architecture may include a server cluster and a client terminal cluster. The client terminal cluster may include a plurality of client terminals, and as shown in FIG. 1, specifically includes a client terminal 3000a, a client terminal 3000b, . . . , and a client terminal 3000n.

As shown in FIG. 1, the server cluster may include a bullet comment server 2000a and a video source server 2000b. The bullet comment server 2000a is configured to store bullet comment data within a predetermined time period as historical bullet comment data, and the video source server 2000b is configured to store a plurality of video data sources.

The client terminal 3000a, the client terminal 3000b, . . . , and the client terminal 3000n may be respectively connected to the server cluster through a network.

As shown in FIG. 1, for better understanding of this solution, in this embodiment of this application, a client terminal may be selected from the client terminal cluster as a target client terminal (for example, the target client terminal is the client terminal 3000a), to help describe a data exchange relationship between the client terminal 3000a and the bullet comment server 2000a and a data exchange relationship between the client terminal 3000a and the video source server 2000b separately. That is, during a process of playing video data (the video data is data returned by the video source server 2000b based on a video download request transmitted by the client terminal 3000a), the target client terminal (the client terminal 3000a) may transmit a bullet comment obtaining request to the bullet comment server 2000a based on a current playback progress of the video data, to enable the bullet comment server 2000a to return historical bullet comment data based on the bullet comment obtaining request.

The historical bullet comment data may be text input data that is inputted by other users on client terminals (for example, the client terminal 3000b) corresponding to the users based on the current playback progress. In this case, it may be understood that: a user (for example, a user A) corresponding to the client terminal 3000a and a user (for example, a user B) corresponding to the client terminal 3000b are synchronously watching the video data. Therefore, the client terminal 3000a may synchronously display bullet comment data uploaded by the client terminal 3000b to the bullet comment server 2000a in the current playback progress. In this case, the bullet comment server 2000a may store the bullet comment data as historical bullet comment data corresponding to the current playback progress in a bullet comment database, and may return the historical bullet comment data based on the received bullet comment obtaining request. In addition, the historical bullet comment data may further include bullet comment data that is uploaded by another client terminal (for example, the client terminal 3000c) and that is received and stored by the bullet comment server within a time period. That is, in this case, compared with the client terminal 3000a and the client terminal 3000b that synchronously play the video data, a playback timestamp of the client terminal 3000c for the video data is earlier than a playback timestamp of the client terminal 3000a and the client terminal 3000b for the video data. For example, the historical bullet comment data may be bullet comment data uploaded by the client terminal 3000c to the bullet comment server 2000a one hour ago (for example, the client terminal 3000c may use text input data obtained when a playback progress is 10% as bullet comment data, and upload the bullet comment data to the bullet comment server 2000a one hour ago). Therefore, for the client terminal 3000a and the client terminal 3000b that synchronously play the video data, when a playback progress of the video data reaches 10%, historical bullet comment data corresponding to the playback progress may be synchronously obtained from the bullet comment server 2000a, and the obtained historical bullet comment data may be further used as bullet comment data corresponding to the video data.

For the time period, a minute, an hour, a day, a month, a year, or the like may be used as a time unit, and no limitation is specifically imposed herein.

It is to be understood that, provided that the bullet comment server 2000a receives a bullet comment obtaining request transmitted by the target client terminal, the bullet comment server 2000a finds historical bullet comment data corresponding to the bullet comment obtaining request in the bullet comment database, and delivers the historical bullet comment data to the target client terminal.

In addition, a user corresponding to the target client terminal may further view text input data inputted by the user in real time on a video playback interface. That is, when receiving the text input data inputted by the user, the target client terminal may use the text input data as bullet comment data corresponding to currently played video data, and displays the bullet comment data on a playback interface corresponding to the video data. In addition, the target client terminal may further upload the bullet comment data to the bullet comment server 2000a that has a network connection relationship with the target client terminal, so that the bullet comment server 2000a stores and/or delivers the bullet comment data. In this case, the bullet comment server 2000a may further store the bullet comment data as historical bullet comment data corresponding to a playback progress of the current video data, and may further synchronously transmit the bullet comment data to other client terminals through which the video data is viewed.

Subsequently, after obtaining the bullet comment data, the target client terminal (that is, the client terminal 3000a) may extract target keyword information entry from the bullet comment data on a backend of the target client terminal, recognize a target object corresponding to the target keyword information entry in the currently played video data based on the target keyword information entry, and may further perform animation processing on a target region in which the target object is located in the target video frame, to enrich a visual display effect of the bullet comment data, and avoid waste of device resources and network resources caused by recognizing and capturing the bullet comment data.

For a specific process in which the target client terminal extracts target keyword information entry from the bullet comment data, recognize a target object corresponding to the target keyword information entry in the target video frame, and performs animation processing on a target region corresponding to the target object, refer to the following embodiments corresponding to FIG. 2 to FIG. 5.

Figure 2:
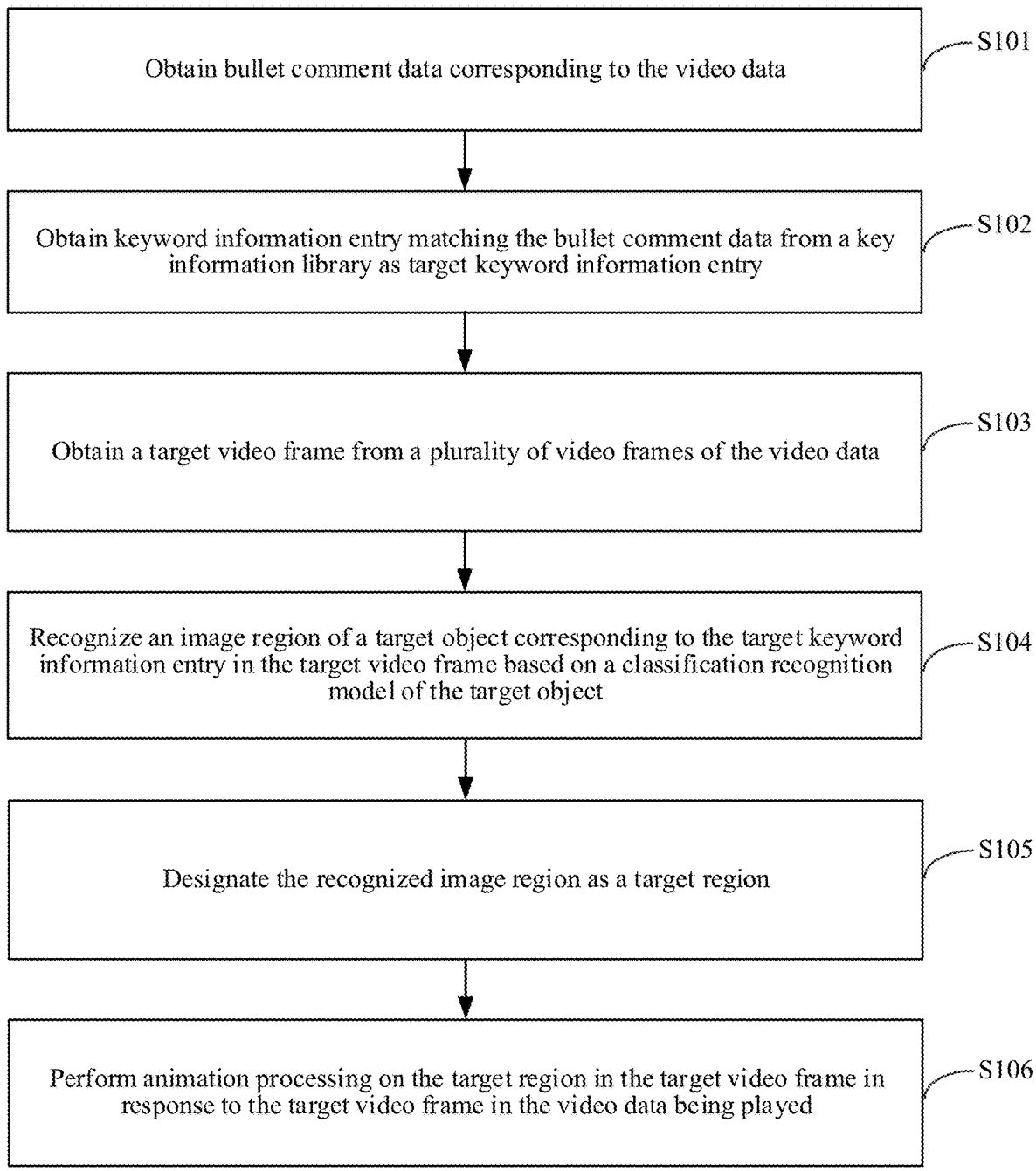
FIG. 2 is a schematic flowchart of a video processing method according to an embodiment of this application.

Further, FIG. 2 is a schematic flowchart of a video processing method according to an embodiment of this application. As shown in FIG. 2, the method may be applied to a client terminal, and includes step S101 to step S106:

Step S101. Play video data, and obtain bullet comment data corresponding to the video data.

Specifically, during a process of playing video data, the client terminal may obtain bullet comment data corresponding to the video data. The bullet comment data may be historical bullet comment data returned by a bullet comment server, or may be text input data inputted by a user corresponding to the client terminal to a playback interface corresponding to the video data. Subsequently, the client terminal may display the bullet comment data on the playback interface corresponding to the video data.

The client terminal may be the target client terminal in the embodiment corresponding to FIG. 1. The client terminal includes a terminal device with a video data playback function, for example, a personal computer, a tablet computer, a notebook computer, a smart TV, or a smartphone.

The bullet comment server may be the bullet comment server 2000a in the embodiment corresponding to FIG. 1. The bullet comment server may be configured to store text input data inputted by each user on a client terminal corresponding to the user for currently played video data (that is, the bullet comment server may be configured to store bullet comment data respectively uploaded by each client terminal), and may further store each piece of bullet comment data according to a playback progress of the video data, so that in a case that a bullet comment function of a client terminal corresponding to a user watching the video data is enabled, corresponding bullet comment data may be obtained based on the playback progress of the video data, and the bullet comment data corresponding to the video data is displayed.

A specific process in which the client terminal obtains and displays the bullet comment data may include: playing the video data, transmitting a bullet comment obtaining request to a bullet comment server, receiving historical bullet comment data returned by the bullet comment server based on the bullet comment obtaining request, using the historical bullet comment data as the bullet comment data corresponding to the video data, and displaying the bullet comment data on a playback interface of the video data.

For convenience of understanding, an example in which the client terminal is the client terminal 3000a in the embodiment corresponding to FIG. 1 is used. Further, FIG. 3 is a schematic diagram of a manner of obtaining bullet comment data according to an embodiment of this application.

Figure 3:
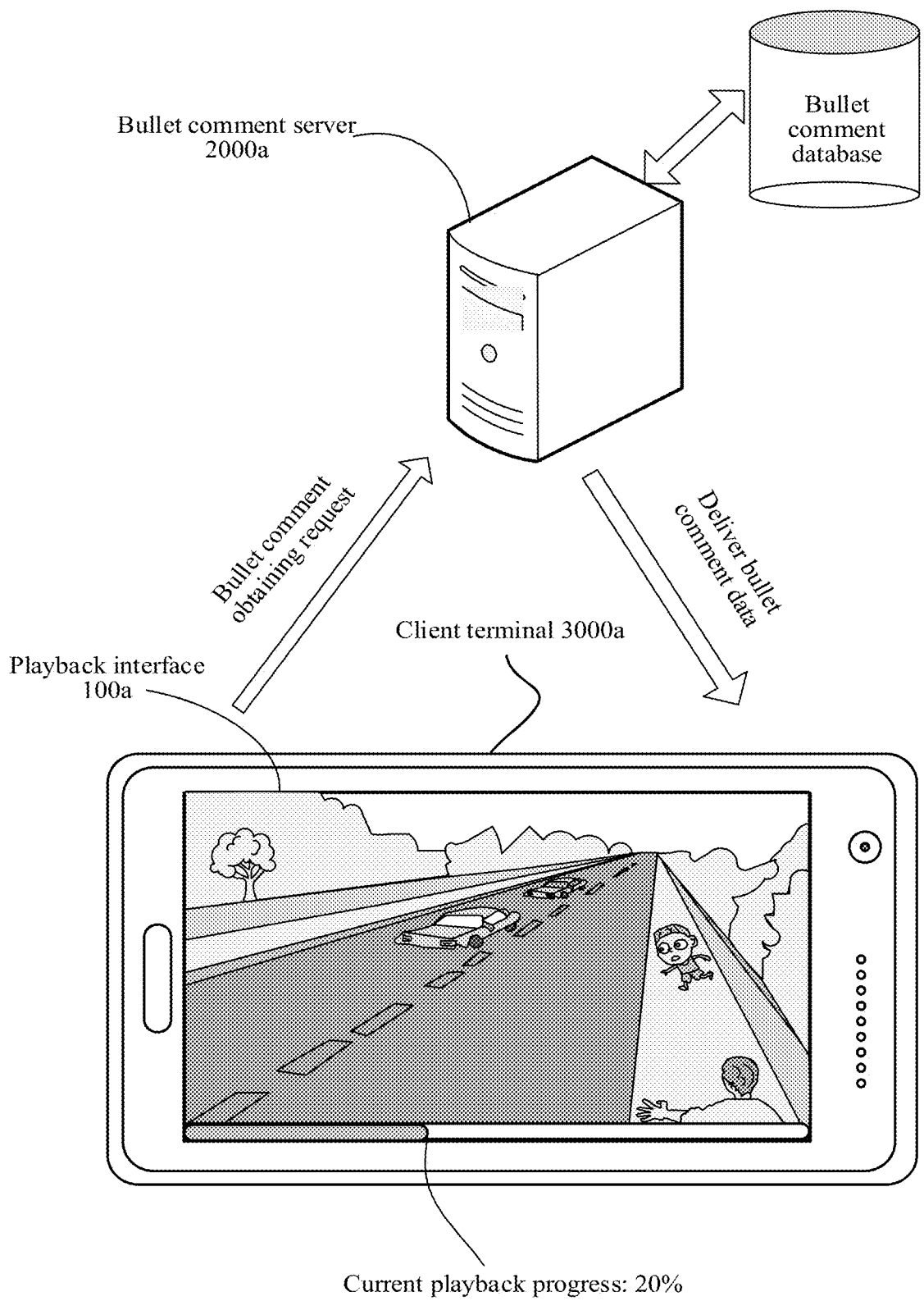
FIG. 3 is a schematic diagram of a manner of obtaining bullet comment data according to an embodiment of this application.

As shown in FIG. 3, during a process of playing video data, the client terminal 3000a may obtain bullet comment data corresponding to the video data when a bullet comment function is enabled. A specific progress of obtaining the bullet comment data may be that: the client terminal 3000a may transmit a bullet comment obtaining request to a bullet comment server 2000a shown in FIG. 3 based on a current playback progress of the video data (that is, a current playback progress shown in FIG. 3 is 20%), and receive historical bullet comment data returned by the bullet comment server 2000a based on the bullet comment obtaining request (the historical bullet comment data may be bullet comment data uploaded by the client terminal 3000b in the embodiment corresponding to FIG. 1 when the playback progress of the video data reaches 20%, and therefore, after receiving the bullet comment data, the bullet comment server 2000a uses the bullet comment data as historical bullet comment data and stores the historical bullet comment data in a bullet comment database shown in FIG. 3). Subsequently, the client terminal 3000a may use the received historical bullet comment data as the bullet comment data corresponding to the video data, and may further display the bullet comment data on a playback interface (that is, a playback interface 100a shown in FIG. 3) of the video data.

Figure 4:
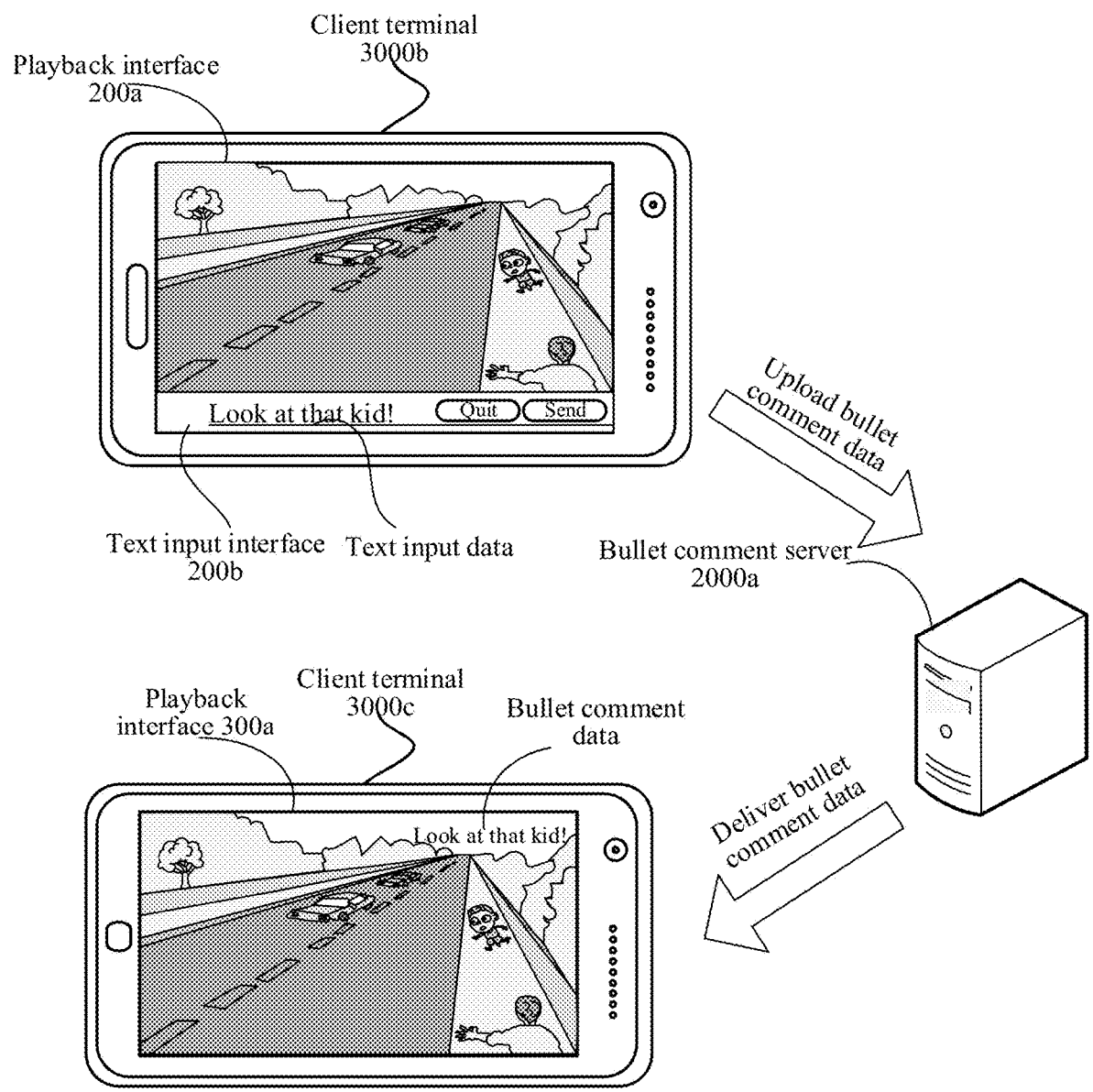
FIG. 4 is a schematic diagram of another manner of obtaining bullet comment data according to an embodiment of this application.

In this case, it is to be understood that, in this embodiment of this application, the client terminal 3000a and the client terminal 3000b do not synchronously play the video data. Therefore, the client terminal 3000a may obtain, from the bullet comment server 2000a based on the playback progress of the video data, bullet comment data uploaded by the client terminal 3000b. For a specific process in which the client terminal 3000b uploads the bullet comment data, reference may be further made to FIG. 4. FIG. 4 is a schematic diagram of another manner of obtaining bullet comment data according to an embodiment of this application.

In this case, a user B and a user C synchronously watch the same video data on different client terminals. The user B holds a client terminal 3000b, and the user C holds a client terminal 3000c. As shown in FIG. 4, when the user B inputs text input data (for example, the text input data is that: Look at that kid) on a text input interface 200b shown in FIG. 4, the client terminal (in this case, the client terminal is the client terminal 3000b shown in FIG. 4) may further use the text input data as bullet comment data of the video data when detecting a bullet comment triggering operation corresponding to the text input data, and display the bullet comment data on a playback interface (that is, a playback interface 200a shown in FIG. 4) of the video data based on a bullet comment track. The bullet comment track is used for representing location information of the bullet comment data on the playback interface 200a (for example, the bullet comment data may be displayed on the first row of the bullet comment track). In addition, the client terminal 3000b may further transmit the bullet comment data (that is, Look at that kid) to a bullet comment server 2000a shown in FIG. 4. In this case, the bullet comment server 2000a may transmit the bullet comment data (that is, Look at that kid) to a client terminal 3000c through which the video data is synchronously watched, so that the client terminal 3000c displays the bullet comment data shown in FIG. 4 on a playback interface 300a of the video data. It can be seen that, for the two client terminals synchronously playing the video data, the bullet comment data corresponding to the video data is synchronously displayed on playback interfaces respectively corresponding to the two client terminals (that is, the client terminal 3000b and the client terminal 3000c).

Optionally, a specific process in which the client terminal obtains and displays the bullet comment data may alternatively include: playing the video data, obtaining text input data, using the text input data as the bullet comment data corresponding to the video data, displaying the bullet comment data on a playback interface of the video data based on a bullet comment track, and transmitting the bullet comment data to a bullet comment server, to enable the bullet comment server to synchronously transmit the bullet comment data to client terminals through which the video data is watched.

It can be seen that, when the client terminal is the client terminal 3000a, bullet comment data obtained by the client terminal is historical bullet comment data returned by the bullet comment server based on a bullet comment obtaining request transmitted by the client terminal. That is, in this case, the client terminal may use the historical bullet comment data as bullet comment data. Optionally, when the client terminal is the client terminal 3000b, bullet comment data obtained by the client terminal is text input data inputted by the user B on a text input interface of the client terminal 3000b. That is, in this case, the client terminal may use the text input data as bullet comment data.

Step S102. Obtain keyword information entry matching the bullet comment data from a key information library as target keyword information entry.

Specifically, the client terminal may obtain the key information library, split the bullet comment data into a plurality of component word entries based on a word segmentation technology, and traverse the key information library to search for keyword information entry matching each of the component word entries. In a case that the client terminal finds keyword information entry matching the component word entry, the client terminal may use the keyword information entry as target keyword information entry corresponding to the bullet comment data, and may further obtain a classification recognition model of a target object corresponding to the target keyword information entry from the key information library.

The key information library includes keyword information entry set by a user, and a classification recognition model of a target object corresponding to each piece of keyword information entry. For example, the keyword information entry may be classification information of target objects, such as a "flower", a "tree", and a "river", that are set by the user. For each piece of keyword information entry set by the user, a classification recognition model of a target object corresponding to the target keyword information entry may be correspondingly found in the key information library. For example, if keyword information entry is "tree", a classification recognition model of a target object (a tree) corresponding to the keyword information entry "tree" may be stored in the key information library, that is, a large quantity of contour features of the tree exist in the key information library.

The word segmentation technology is that the client terminal may perform word segmentation processing on the bullet comment data, to split the bullet comment data into a plurality of component word entries. For example, the bullet comment data is "That flower is beautiful". The client terminal may obtain, using the word segmentation technology, the following four split component word entries: "That", "flower", "is", and "beautiful". Subsequently, the client terminal may further traverse the key information library to search for keyword information entry respectively matching the four component word entries. For convenience of understanding, for example, keyword information entry set by a user in the key information library is "flower". Then, the client terminal may find keyword information entry (flower) matching the component word entry ("flower") in the key information library, and use the keyword information entry (flower) as target keyword information entry corresponding to the bullet comment data ("That flower is beautiful"). Subsequently, the client terminal may further obtain a classification recognition model of a target object corresponding to the target keyword information entry (flower) from the key information library. That is, a large quantity of contour features of the target object (flower) may be obtained, so that the client terminal may further perform step S103.

For convenience of understanding, in this embodiment of this application, an example in which there is one piece of target keyword information entry is used, to help further describe the following step S103 through step S106 in detail.

It is to be understood that, there may be a plurality of pieces of target keyword information entry in the bullet comment data, and each piece of target keyword information entry corresponds to a classification recognition model of one type of target object. For example, if the target keyword information entry is cat and dog, a classification recognition model of cat and a classification recognition model of dog may be obtained from the key information library. Therefore, a quantity of the target keyword information entry corresponding to the video data is not limited herein. For a process of recognizing target objects respectively corresponding to a plurality of pieces of target keyword information entry in the target video frame, refer to a process of recognizing a target object corresponding to one piece of target keyword information entry in the target video frame in this embodiment of this application.

Step S103. Obtain a target video frame from a plurality of video frames of the video data. Step S104. Recognize an image region of a target object corresponding to the target keyword information entry in the target video frame based on a classification recognition model of the target object. Step S105. Determine the recognized image region as a target region.

Specifically, the client terminal may obtain a target video frame from a plurality of video frames of the video data. The target video frame is a video frame within a predetermined time period before or after the bullet comment data appears. For example, the target video frame is a video frame within 3 seconds before or after the bullet comment data appears. Further, the target video frame is divided into a plurality of sub-regions, a selective search is performed on the plurality of sub-regions, sub-regions obtained after the selective search are combined to obtain a plurality of combined regions, and the plurality of sub-regions and the plurality of combined regions are determined as to-be-processed regions. In addition, the client terminal may further perform feature extraction on the to-be-processed regions based on a neural network model, to obtain image features corresponding to the to-be-processed regions. Then, the client terminal may further generate recognition probabilities corresponding to the to-be-processed regions based on the image features and the classification recognition model corresponding to the target keyword information entry, and select, according to the recognition probabilities, candidate regions including the target object corresponding to the target keyword information entry from the to-be-processed regions. Finally, the client terminal may perform optimal selection on the candidate regions corresponding to the target video frame based on a regression model, and determine a selected optimal candidate region corresponding to the target video frame as the target region.

It is to be understood that, after obtaining the bullet comment data, the client terminal displays the bullet comment data on a playback interface corresponding to the video data, and the bullet comment data is dynamically displayed on a bullet comment track corresponding to the playback interface, so that the bullet comment data corresponding to the video data may be displayed in different video frames of the video data. That is, in this time period of dynamically displaying the bullet comment data (in this application, this time period may be defined as a bullet comment display time period), video frames in a video stream corresponding to the bullet comment data (that is, the video data corresponding to the bullet comment data) are also synchronously and dynamically played in chronological order. Therefore, provided that the target keyword information entry in the bullet comment data is displayed on the playback interface corresponding to the video data, the client terminal obtains a target video frame from the video frames corresponding to the bullet comment data (that is, the client terminal may split the video data corresponding to the bullet comment data into a plurality of video frames, and may further use a currently played video frame in the plurality of video frames as a target video frame), so that the client terminal further recognizes a target object corresponding to the target keyword information entry in the target video frame.

In view of this, the client terminal may recognize the target object corresponding to the target keyword information entry in the plurality of video frames corresponding to the bullet comment data within the bullet comment display time period corresponding to the bullet comment data. For a specific process in which the client terminal recognizes a target object corresponding to the target keyword information entry in each video frame, refer to a process in which the client terminal recognizes a target object corresponding to the target keyword information entry in the target video frame.

The neural network model may be a convolutional neural network (CNN) model, or may be a combined model of the CNN model and a recurrent neural network (RNN) model. The neural network model may be configured to perform feature extraction on all to-be-processed regions inputted into the neural network model, to obtain image features respectively corresponding to all the to-be-processed regions. However, before feature extraction is performed on all the to-be-processed regions, the client terminal needs to first divide the target video frame to obtain a plurality of sub-regions corresponding to the target video frame, perform a selective search on the plurality of sub-regions, and combine sub-regions obtained after the selective search, to obtain a plurality of combined regions (the plurality of combined regions include combined regions obtained after a plurality of combinations). Therefore, the client terminal may use all the sub-regions and the plurality of combined regions as to-be-processed regions, and further perform feature extraction on the to-be-processed regions using the neural network model, to obtain image features corresponding to the to-be-processed regions.

For convenience of understanding, in this embodiment of this application, an example in which feature extraction is performed on one to-be-processed region selected from the plurality of to-be-processed regions is used. A specific process in which the client terminal extracts an image feature corresponding to the to-be-processed region may be that: the client terminal performs convolution processing using a neural network model (for example, the CNN model). That is, the client terminal may randomly select a small quantity of feature information in the to-be-processed region as samples (that is, convolution kernels), and use the samples as windows to sequentially slide through the to-be-processed region. In other words, a convolution operation is performed on the samples and the to-be-processed region, thereby obtaining spatial feature information of the to-be-processed region. After the convolution operation, the spatial feature information of the to-be-processed region is obtained. However, a quantity of the spatial feature information is large. To reduce a subsequent calculation amount, aggregated statistics collection is performed on the spatial feature information based on pooling processing of the CNN model. A quantity of spatial feature information after the aggregated statistics collection is far less than a quantity of the spatial feature information extracted through the convolution operation. Simultaneously, a subsequent classification effect (that is, an effect of recognizing the target object) is also improved. A common pooling method mainly includes an average pooling operation method and a maximum pooling operation method. The average pooling operation method is that a piece of average feature information is calculated from a feature information set to represent a feature of the feature information set. The maximum pooling operation method is that a piece of maximum feature information is extracted from a feature information set to represent a feature of the feature information set. It can be seen that, using the foregoing method, spatial feature information of all to-be-processed regions may be extracted, and the spatial feature information is used as image features respectively corresponding to the to-be-processed regions.

In addition, after obtaining the spatial feature information of the to-be-processed region through extraction, the client terminal may further perform sequential processing using an RNN model. That is, in a forget gate of the RNN model, a processor first calculates information that needs to be removed from a cell state, then, in an input gate, the processor calculates information that needs to be stored in the cell state, and finally, in an output gate, the cell state is updated. In other words, the processor multiplies an old cell state by information that needs to be removed, and then adds information that needs to be stored, to obtain a new cell state. Spatial-temporal feature information hidden in the to-be-processed region may be extracted through linear effects between the spatial feature information of the to-be-processed region and a plurality of cell states. It can be seen that, using the foregoing method, spatial-temporal feature information of all the to-be-processed regions may be extracted, and the spatial-temporal feature information is referred to as image features respectively corresponding to the to-be-processed regions.

The recognition probabilities are used for representing probabilities that the to-be-processed regions include the target object.

It is to be understood that, for one target video frame, the client terminal only needs to perform the selective search once in the plurality of divided sub-regions according to a selective search algorithm, to obtain a plurality of sub-regions obtained after the selective search. In this case, there are specific correlations between the plurality of sub-regions (for example, texture similarity or color similarity). Therefore, the client terminal may greatly reduce a quantity of searched regions using the selective search algorithm, thereby improving efficiency of recognizing the target object.

That the client terminal combines the sub-regions obtained after the selective search means that the client terminal may combine every two adjacent sub-regions based on a combination rule (for example, texture similarity or color similarity), and perform a plurality of combinations according to a quantity of the sub-regions obtained after the selective search during a process of combining the sub-regions until a combined region carrying a complete image is obtained.

For example, the client terminal may divide the target video frame into a plurality of sub-regions on a backend (for example, the target video frame may be divided into 1000 sub-regions, that is, the client terminal may split a video frame image corresponding to the target video frame into a plurality of image blocks; and in this case, it is to be understood that, the division of the sub-regions is invisible for a user.) Subsequently, the client terminal may further perform a selective search on the sub-regions, to obtain a plurality of sub-regions obtained after the selective search (for example, the client terminal may select 500 sub-regions carrying image features from the 1000 divided sub-regions as the sub-regions obtained after the selective search), and may further combine the sub-regions obtained after the selective search. That is, the client terminal may combine two adjacent sub-regions according to a combination rule such as colors or textures, to obtain a plurality of combined regions. It is to be understood that, the client terminal may repeatedly combine, based on the combination rule, the combined regions that have been combined, to obtain a combined region including a complete image. Subsequently, the client terminal may determine the plurality of sub-regions and the plurality of the combined regions as to-be-processed regions. That is, the client terminal may use all image regions that have appeared and that correspond to the target video frame as the to-be-processed regions, and input the to-be-processed regions into the neural network model.

For another example, for better understanding of the combination rule, in this embodiment of this application, an example in which 8 sub-regions obtained after the selective search are obtained by performing the selective search on the sub-regions of the target video frame is used. Before a selective search is performed, the client terminal may split the target video frame into 100 sub-regions. In addition, the client terminal may further perform the selective search on the 100 sub-regions using a selective search algorithm, to obtain the following 8 sub-regions obtained after the selective search: a-b-c-d-e-f-g-h. Then, the client terminal may combine the 8 sub-regions based on the combination rule (that is, combining two adjacent sub-regions). Therefore, combined regions obtained by the client terminal after the first combination may be ab-cd-ef-gh. Combined regions obtained by the client terminal after the second combination may be abcd-efgh. A combined region obtained by the client terminal after the third combination may be abcdefgh. In this case, a combined region including a complete image is obtained.

It is to be understood that, the to-be-processed regions include: 100 split sub-regions, 8 sub-regions (a-b-c-d-e-f-g-h) obtained after the selective search, four combined regions (ab-cd-ef-gh) obtained after the first combination, two combined regions (abcd-efgh) obtained after the second combination, and one combined region (abcdefgh) obtained after the third combination. That is, there are a total of 115 (that is, 100+8+4+2+1) to-be-processed regions including image features.

Subsequently, the client terminal may further perform feature extraction on the to-be-processed regions based on a neural network model (the neural network model may be a CNN model, or may be a CNN+RNN model). That is, the client terminal may input the to-be-processed regions into the neural network model, to output image features corresponding to the to-be-processed regions (for example, for 115 to-be-processed regions, image features respectively corresponding to the 115 to-be-processed regions may be correspondingly obtained). Then, the client terminal may further generate recognition probabilities corresponding to the to-be-processed regions based on the image features and the classification recognition model corresponding to the target keyword information entry (for example, the target keyword information entry may be kid in the embodiment corresponding to FIG. 4, and in this case, the classification recognition model includes a large quantity of contour features corresponding to kid). In this case, each to-be-processed region corresponding to one recognition probability. Therefore, the client terminal may further select, according to the recognition probabilities, candidate regions including the target object corresponding to the target keyword information entry from the to-be-processed regions (that is, the client terminal may use to-be-processed regions whose recognition probabilities are greater than a probability threshold as candidate regions corresponding to the target keyword information entry). In this case, the candidate regions carry image features that can completely represent the target object.

For example, for the target keyword information entry (kid) in the embodiment corresponding to FIG. 4, the to-be-processed regions determined by the client terminal are 115 to-be-processed regions. By inputting the 115 to-be-processed regions into the neural network model, image features corresponding to the to-be-processed regions may be outputted, that is, 115 image features may be obtained. The client terminal matches the 115 image features with a classification recognition model corresponding to kid, that is, further inputs the 115 image features into a classifier corresponding to the neural network model (in this case, the classifier may be a classifier built-in the neural network model), so that recognition probabilities respectively corresponding to the 115 image features may be outputted. In this case, the client terminal may obtain the recognition probabilities respectively corresponding to the 115 to-be-processed regions. Subsequently, the client terminal may select to-be-processed regions whose recognition probabilities are greater than a probability threshold from the 115 to-be-processed regions as candidate regions including the target object corresponding to the target keyword information entry. That is, in this case, the client terminal may complete recognition of the target object in the target video frame, that is, may determine that the target video frame includes the target object.

Finally, the client terminal may perform optimal selection on the candidate regions corresponding to the target video frame based on a regression model, and determine a selected optimal candidate region corresponding to the target video frame as the target region.

The regression model may be used for positioning a location of the target object in the target video frame. That is, the client terminal may select an optimal candidate region corresponding to the target video frame from the plurality of candidate regions corresponding to the target object using the regression model, and may further determine the optimal candidate region as the target region. It is to be understood that, the optimal candidate region is an image region of the target object corresponding to the target keyword information entry in the target video frame. Therefore, the client terminal may determine the optimal candidate region as the target region.

It is to be understood that, the target video frame may be a currently played video frame, or may be a video frame that is different from the currently played video frame and that is in a plurality of video frames corresponding to the bullet comment data, for example, a video frame that has not been played in the video data. Therefore, that the client terminal recognizes a target object in a plurality of video frames corresponding to the bullet comment data may be: sequentially recognizing the target object corresponding to the target keyword information entry in video frames in chronological order of the video frames, and determining target regions of the target object in the video frames one by one. Certainly, the client terminal may further synchronously recognize the target object in the plurality of video frames corresponding to the bullet comment data. That is, when obtaining the plurality of video frames corresponding to the bullet comment data, the client terminal may use each of the plurality of video frames as a target video frame. That is, the client terminal may perform pre-processing on video frames that have not been played, thereby helping to recognize, in advance, the target object in the video frames that have not been played, to obtain a target region of the target object in each video frame. In this case, when playing the target video frame in the video data, that is, sequentially playing all video frames in chronological order, the client terminal may instantaneously perform animation display of the target region corresponding to the target object.

For convenience of understanding, in this embodiment of this application, using only an example in which a currently played video frame is used as the target video frame, a target object corresponding to the target keyword information entry in the target video frame is recognized. Certainly, when another video frame in the plurality of the video frames corresponding to the bullet comment data is determined as the target video frame, for recognition on a target object corresponding to the target keyword information entry in each video frame, reference may still be made to a process of recognizing a target object in the currently played video frame in this embodiment of this application, and details are not described herein again.

Step S106. Perform animation processing on the target region in the target video frame in a case that the target video frame in the video data is played.

It is to be understood that, the video data corresponding to the bullet comment data is dynamically played, that is, video frames in the video data corresponding to the bullet comment data are played one by one in chronological order. Therefore, when each of the plurality of video frames is played (that is, when all video frames in the video data corresponding to the bullet comment data are sequentially played in chronological order), the client terminal performs animation processing on the target region in the target video frame (for example, the client terminal may perform rendering processing on the target region, and zoom in the target region after the rendering processing).

Therefore, by associating keyword information entry in the bullet comment data with the target object located in the target region in the target video frame, a visual display effect of the bullet comment data may be enriched.

In this embodiment of this application, after bullet comment data in a process of playing the video data is obtained, all key content (that is, all keyword information entry) in the bullet comment data may be further extracted based on a key information library. In addition, a target object corresponding to a target video frame in a plurality of video frames of the video data may be recognized using a classification recognition model of a target object corresponding to each piece of keyword information entry, a specific location of the target object in the target video frame (that is, a target region of the target object in the target video frame) may be further determined, and animation display of the target region is performed. Therefore, by associating keyword information entry in the bullet comment data with the target object located in the target region in the target video frame, a visual display effect of the bullet comment data may be enriched.

Figure 5:
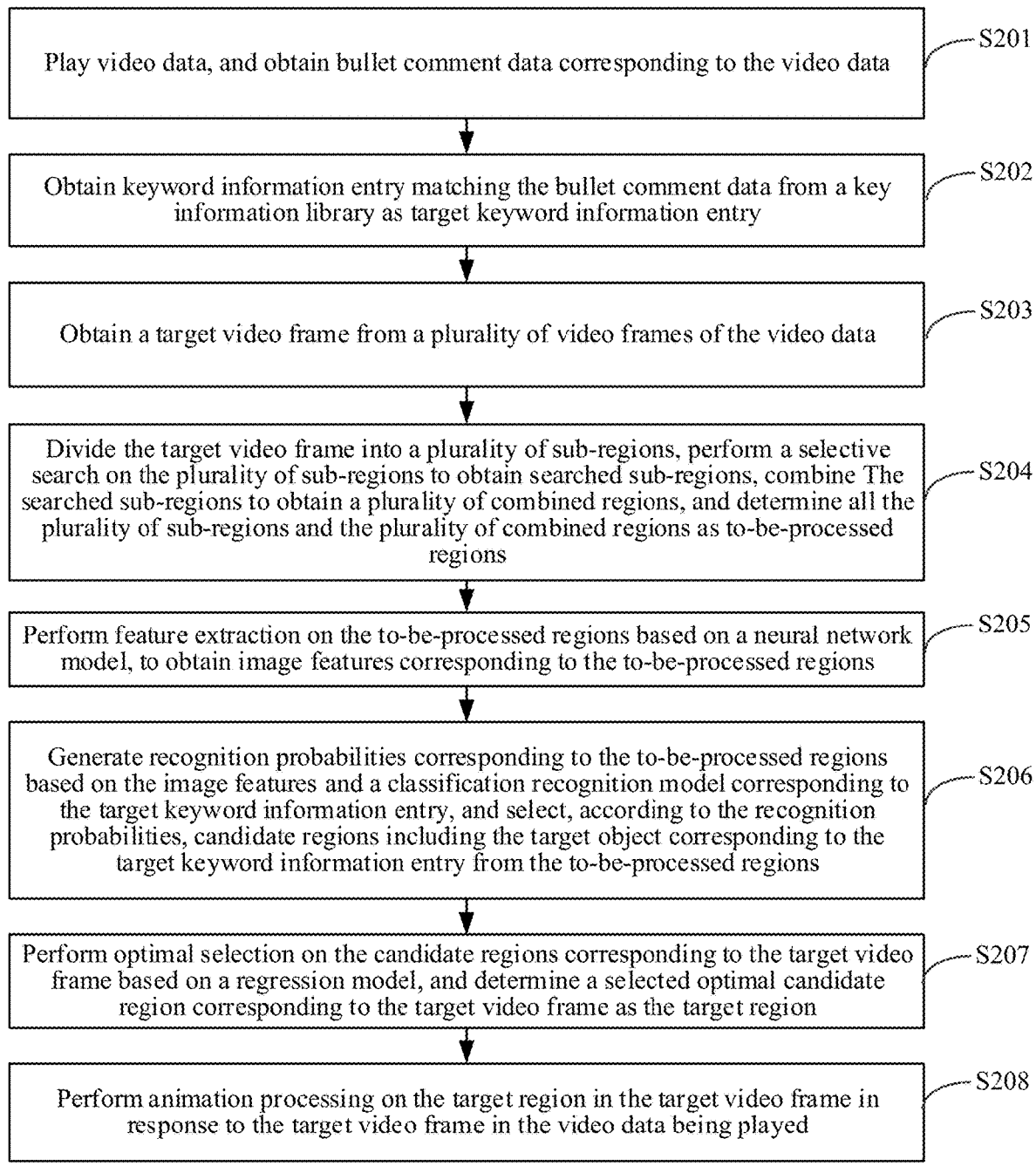
FIG. 5 is a schematic flowchart of another video processing method according to an embodiment of this application.

Further, FIG. 5 is a schematic flowchart of another video processing method according to an embodiment of this application. As shown in FIG. 5, the method may include step S201 to step S208.

Step S201. Play video data, and obtain bullet comment data corresponding to the video data.

Step S202. Obtain keyword information entry matching the bullet comment data from a key information library as target keyword information entry.

For specific methods for performing step S201 and step S202, refer to the descriptions of step S101 and step S102 in the embodiment corresponding to FIG. 2. Details are not described herein again.

Step S203. Obtain a target video frame from a plurality of video frames of the video data.

Specifically, the client terminal may obtain a target video frame from a plurality of video frames in the video data corresponding to the bullet comment data. That is, when the bullet comment data is displayed on a playback interface corresponding to the video data, the client terminal may obtain a video stream corresponding to the bullet comment data (the video stream is formed by a plurality of video frames corresponding to the bullet comment data in chronological order of playback), and may further split the video stream into a plurality of video frames corresponding to the bullet comment data. Therefore, the client terminal may select one video frame from the plurality of video frames as a target video frame.

Figure 6:
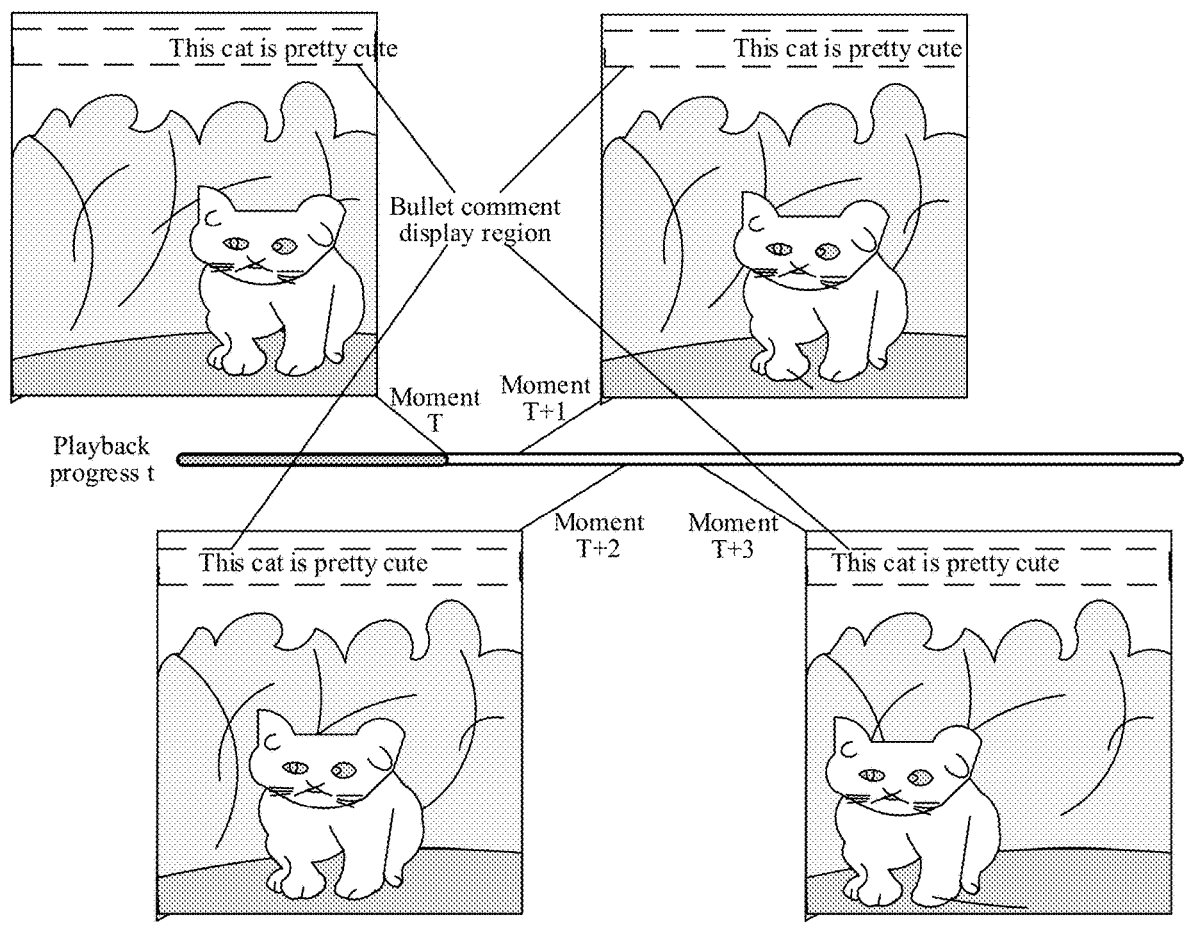
FIG. 6 is a schematic diagram of displaying bullet comment data in a plurality of video frames according to an embodiment of this application.

Further, FIG. 6 is a schematic diagram of displaying bullet comment data in a plurality of video frames according to an embodiment of this application. As shown in FIG. 6, during a process of dynamically playing video data in the client terminal, bullet comment data corresponding to the video data may be displayed in different video frames of the video data, thereby presenting an effect diagram of dynamically displaying the bullet comment data shown in FIG. 6. The bullet comment data corresponding to the video data is displayed based on a bullet comment track shown in FIG. 6 (that is, the bullet comment data may be displayed from right to left in a bullet comment display region shown in FIG. 6, and it is to be understood that, the bullet comment display region shown in FIG. 6 is virtual for a user). In a playback progress bar shown in FIG. 6, if a current playback progress is t=T, the bullet comment data may be located on the rightmost side of the bullet comment display region, that is, the bullet comment data is just displayed on a playback interface corresponding to the video data. If the current playback progress is t=T+1, the bullet comment data may be located on the center-right side of the bullet comment display region. If the current playback progress is t=T+2, the bullet comment data may be located on the center-left side of the bullet comment display region. If the current playback progress is t=T+3, the bullet comment data may be located at the leftmost of the bullet comment display region, that is, the bullet comment data is to leave the playback interface corresponding to the video data.

As shown in FIG. 6, a video frame at a moment T is a currently played video frame in the video data, and video frames at a moment T+1, a moment T+2, and a moment T+3 are video frames that are to be played in sequence in the video data. For convenience of understanding, in this embodiment of this application, only an example in which the target video frame is a currently played video frame in the video data is used. That is, in four video frames shown in FIG. 6, a video frame whose playback progress is at a moment t=T is used as a target video frame, so that a target object corresponding to the target keyword information entry (for example, cat) is recognized in the target video frame corresponding to the bullet comment data.

It is to be understood that, when sequentially playing remaining video frames (that is, a video frame corresponding to the moment T+1, a video frame corresponding to the moment T+2, and a video frame corresponding to the moment T+3) in the video stream, the client terminal may sequentially use all of the remaining video frames as a target video frame in chronological order, to recognize the target object corresponding to the target keyword information entry (cat) in the remaining video frames. That is, for each video frame, step S203 to step S207 need to be cyclically performed according to a current play time progress, to recognize the target object corresponding to the target keyword information entry in all the video frames in the video data.

Certainly, the target video frame may alternatively be a plurality of video frames corresponding to the bullet comment data. That is, the client terminal may further use the plurality of video frames in the video data corresponding to the bullet comment data together as target video frames, to further recognize the target object corresponding to the target keyword information entry (cat) in the target video frames. That is, after performing step S203, the client terminal may further synchronously perform the following step S204 to step S207 on all the video frames, and may recognize the target object corresponding to the target keyword information entry in all the video frames together. Therefore, for video frames that have not been played in the video data, the client terminal may perform pre-processing on all the video frames that have not been played according to the following step S204 to step S207.

Certainly, for better understanding of this solution, in this embodiment of this application, only an example in which the target video frame is a currently played video frame in the plurality of video frames is used, to recognize a target object corresponding to the target keyword information entry in the target video frame. Therefore, when remaining video frames in the plurality of video frames are determined as the target video frames, for a process of recognizing the target object corresponding to the target keyword information entry in the remaining video frames in the plurality of video frames, refer to a specific progress of recognizing the target object in the currently played video frame (that is, the target video frame) listed in this embodiment of this application.

Step S204. Divide the target video frame into a plurality of sub-regions, perform a selective search on the plurality of sub-regions to obtain searched sub-regions, combine the searched sub-regions to obtain a plurality of combined regions, and determine all the plurality of sub-regions and the plurality of combined regions as to-be-processed regions.

That the client terminal combines the sub-regions obtained after the selective search means that the client terminal may combine every two adjacent sub-regions based on a combination rule (for example, texture similarity or color similarity), and perform a plurality of combinations according to a quantity of the sub-regions obtained after the selective search during a process of combining the sub-regions until a combined region carrying a complete image is obtained.

For determining of the to-be-processed regions, refer to the description of the to-be-processed regions in the embodiment corresponding to FIG. 2. That is, the client terminal may determine all the plurality of combined regions obtained after a plurality of combinations and the plurality of sub-regions obtained after splitting as the to-be-processed regions. For a specific process in which the client terminal splits the target video frame, performs a selective search on the split sub-regions, and combines sub-regions obtained after the selective search, reference may be made to descriptions of the plurality of sub-regions and the plurality of combined regions in the embodiment corresponding to FIG. 2. Details are not described herein again.

Step S205. Perform feature extraction on the to-be-processed regions based on a neural network model, to obtain image features corresponding to the to-be-processed regions.

Specifically, the client terminal may scale image blocks in the to-be-processed regions to the same size, use the to-be-processed regions having the same size as inputs of the neural network model, and output image features corresponding to the image blocks in the to-be-processed regions using the neural network model.

Figure 7:
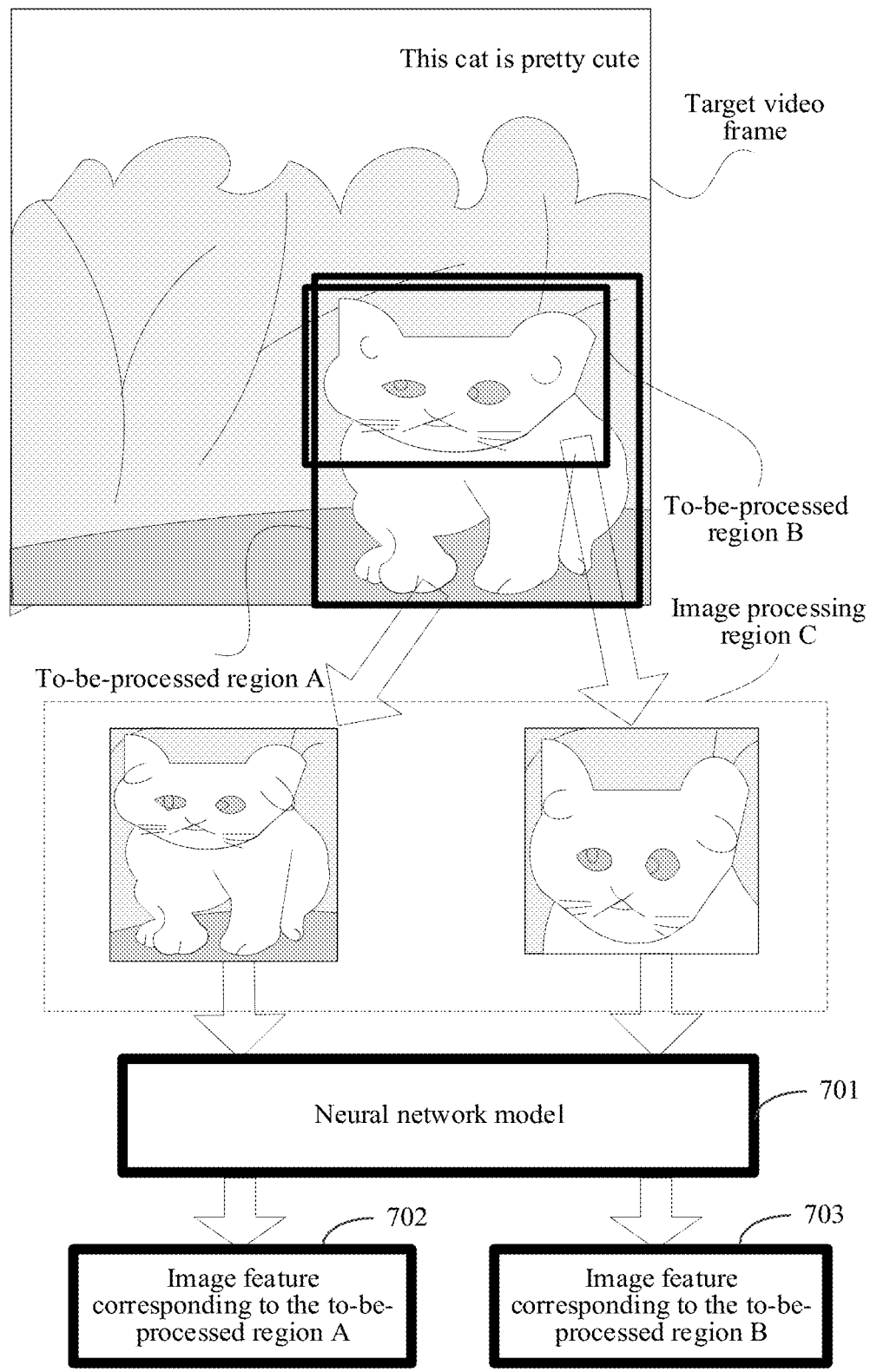
FIG. 7 is a schematic diagram of feature extraction according to an embodiment of this application.

Further, FIG. 7 is a schematic diagram of feature extraction according to an embodiment of this application. As shown in FIG. 7, in an image processing region C shown in FIG. 7, the client terminal may perform image processing on an image block in a to-be-processed region A corresponding to the target video frame and an image block in a to-be-processed region B corresponding to the target video frame. That is, the client terminal may scale the image block in the to-be-processed region A and the image block in the to-be-processed region B to the same size, to ensure accuracy of performing image feature extraction on the image blocks in all the to-be-processed regions. Subsequently, the client terminal may further use the to-be-processed regions having the same size as inputs of the neural network model, and output image features corresponding to the image blocks in the to-be-processed regions using the neural network model 701 (that is, the client terminal may obtain an image feature of the to-be-processed region A 702 and an image feature of the to-be-processed region B 703 shown in FIG. 7).

It is to be understood that, the to-be-processed region A and to-be-processed region B listed in this embodiment of this application are only some to-be-processed regions corresponding to the target video frame. In an actual application, the client terminal performs image processing on the image blocks in all the to-be-processed regions, uses all the to-be-processed regions having the same size after the image processing as inputs of the neural network model, and outputs image features respectively corresponding to the image blocks in the to-be-processed regions using the neural network model (for example, if there are 1000 to-be-processed regions, image features that one-to-one correspond to image blocks in the 1000 to-be-processed regions are extracted).

Step S206. Generate recognition probabilities corresponding to the to-be-processed regions based on the image features and the classification recognition model corresponding to the target keyword information entry, and select, according to the recognition probabilities, candidate regions including the target object corresponding to the target keyword information entry from the to-be-processed regions.

The recognition probabilities indicate probabilities that the to-be-processed regions include the target object.

For another example, in the target video frame shown in FIG. 7, the target keyword information entry of the bullet comment data is cat, and a classification recognition model corresponding to the target keyword information entry includes a plurality of types of contour features that have been trained and that correspond to cat. Therefore, the client terminal may further respectively compare the image feature corresponding to the to-be-processed region A and the image feature corresponding to the to-be-processed region B shown in FIG. 7 with the contour features in the classification recognition model using a classifier (that is, a classification recognition model, for example, a support vector machine) in the neural network model, to obtain a recognition probability (for example, 90%) corresponding to the to-be-processed region A and a recognition probability (for example, 40%) corresponding to the to-be-processed region B. In this case, the client terminal may further determine that a candidate region of the target object corresponding to the target keyword information entry is the to-be-processed region A according to the recognition probability of the to-be-processed region A and the recognition probability corresponding to the to-be-processed region B. That is, the client terminal may determine the to-be-processed region A whose recognition probability is greater than a recognition probability threshold (for example, 70%) as a candidate region of the target object corresponding to the target keyword information entry. Therefore, in this case, the client terminal may determine that the to-be-processed region A includes the target object corresponding to the target keyword information entry, and consider that the to-be-processed region B does not include the target object corresponding to the target keyword information entry.

Step S207. Perform optimal selection on the candidate regions corresponding to the target video frame based on a regression model, and determine a selected optimal candidate region corresponding to the target video frame as the target region.

Specifically, the client terminal may perform optimal selection on the candidate regions corresponding to the target video frame based on a regression model, and select an optimal candidate region corresponding to the target video frame from the candidate regions; determine a previous video frame of the target video frame as a reference video frame, and obtain a plurality of reference candidate regions corresponding to the reference video frame; select pre-estimated regions from the plurality of reference candidate regions corresponding to the reference video frame; determine overlap rates between the pre-estimated regions and the optimal candidate region corresponding to the target video frame; and obtain a pre-estimated region having the highest overlap rate, correct the optimal candidate region corresponding to the target video frame using the pre-estimated region having the highest overlap rate, and determine the corrected optimal candidate region as the target region.

The plurality of reference candidate regions corresponding to the reference video frame are selected from to-be-processed regions corresponding to the reference video frame using the classification recognition model corresponding to the target keyword information entry, and the to-be-processed regions corresponding to the reference video frame are generated by performing a selective search on the reference video frame.

Figure 8:
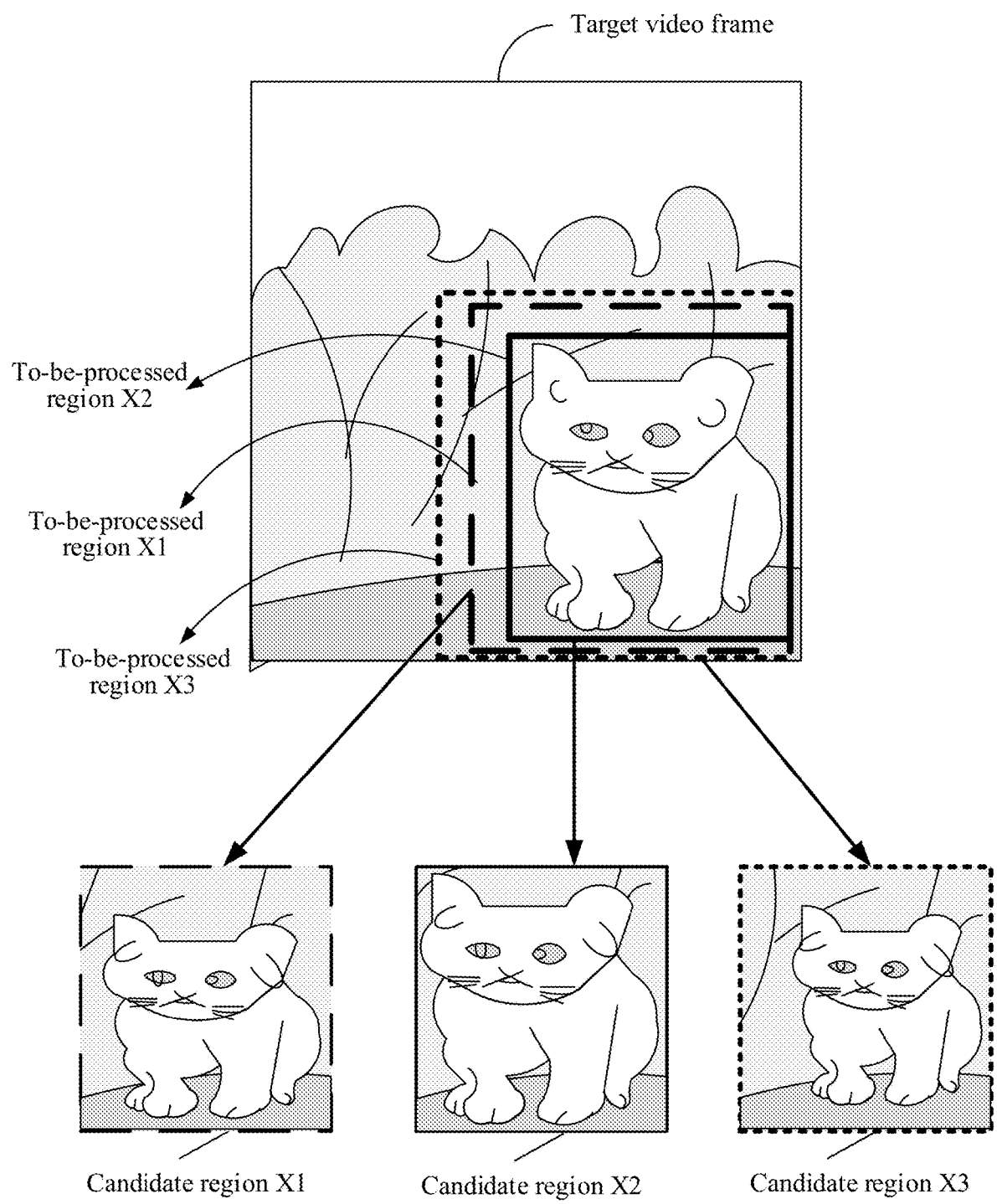
FIG. 8 is a schematic diagram of selecting an optimal candidate region according to an embodiment of this application.

After performing step S206, the client terminal may use a plurality of to-be-processed regions including the target object corresponding to the target keyword information entry as the candidate regions (in this case, it is to be understood that, the to-be-processed regions are obtained by the client terminal by scaling a to-be-processed region X1, a to-be-processed region X2, and a to-be-processed region X3 that correspond to the target video frame shown in FIG. 8). Therefore, as shown in FIG. 8, there are mapping relationships between the to-be-processed regions (that is, the to-be-processed region X1, the to-be-processed region X2, and the to-be-processed region X3) corresponding to the target video frame and three candidate regions including the target object shown in FIG. 8. That is, there is a mapping relationship between the to-be-processed region X1 and a candidate region X1, there is a mapping relationship between the to-be-processed region X2 and a candidate region X2, and there is a mapping relationship between the to-be-processed region X3 and a candidate region X3. Therefore, the client terminal may perform optimal selection on the three candidate regions shown in FIG. 8. Specifically, FIG. 8 is a schematic diagram of selecting an optimal candidate region according to an embodiment of this application. As shown in FIG. 8, after a plurality of candidate regions (that is, the candidate region X1, the candidate region X2, and the candidate region X3) corresponding to the target video frame are obtained, an optimal candidate region corresponding to the target video frame may be selected from the plurality of candidate regions based on a regression model.

In some embodiments, normalized distances between the target object in the candidate regions and candidate borders of the candidate regions in which the target object is located are respectively calculated using a regression model, a candidate region in which a normalized distance satisfies a predetermined condition is used as an optimal candidate region corresponding to the target video frame, and the selected optimal candidate region is determined as the target region. The predetermined condition is that a normalized distance between the target object and a candidate border of a candidate region in which the target object is located is the shortest or a normalized distance between the target object and a candidate border of a candidate region in which the target object is located is the longest.

For convenience of understanding, in this application, candidate borders of the three candidate regions are represented using different line types, and for the candidate borders of each line type, a corresponding to-be-processed region may be correspondingly found in the target video frame shown in FIG. 8.

Because in this case, the candidate regions of all the to-be-processed regions are all scaled to the same size, the client terminal may respectively calculate normalized distances between the target object in the candidate regions and the candidate borders of the candidate regions using the regression model. That is, it may be understood as that location information (for example, center-point location information) of all the to-be-processed regions inputted into the neural network model in the target video frames and length values and width values of all the to-be-processed regions may be obtained using the regression model. Therefore, by calculating the normalized distances corresponding to all the candidate regions, in the candidate region X1 shown in FIG. 8, it may be determined that a normalized distance between the target object and a candidate border of the candidate region X1 is relatively long, in the candidate region X2 shown in FIG. 8, it is determined that a normalized distance between the target object and a candidate border of the candidate region X2 is the shortest, and in the candidate region X3 shown in FIG. 8, it is determined that a normalized distance between the target object and a candidate border of the candidate region X3 is the longest. Therefore, the candidate region X2 shown in FIG. 8 may be used as the optimal candidate region corresponding to the target video frame.

It is to be understood that, for a process of selecting an optimal candidate region of each of a plurality of video frames corresponding to the bullet comment data, reference may be made to a process of selecting an optimal candidate region shown in FIG. 8, and details are not described herein again.

Further, the client terminal may determine a previous video frame of the target video frame as a reference video frame, and obtains a plurality of reference candidate regions corresponding to the reference video frame.

The reference video frame may be a previous video frame of the target video frame. That is, both the reference video frame and the target video frame are some video frames in the currently played video data. For determining of a plurality of reference candidate regions corresponding to the reference video frame, refer to a specific process of determining a plurality of candidate regions corresponding to the target video frame in the embodiment corresponding to FIG. 8. That is, the plurality of reference candidate regions corresponding to the reference video frame are selected from to-be-processed regions corresponding to the reference video frame using the classification recognition model corresponding to the target keyword information entry, and the to-be-processed regions corresponding to the reference video frame are generated by performing a selective search on the reference video frame.

Therefore, the client terminal may select pre-estimated regions from the plurality of reference candidate regions corresponding to the reference video frame.

Specifically, the client terminal may first obtain a target region of the target object in the reference video frame, obtain location information of the target region in the reference video frame as first location information, and obtain location information of the reference candidate regions corresponding to the reference video frame as second location information. In addition, the client terminal may further calculate a distance between the first location information and the second location information corresponding to the reference video frame, and use candidate regions which are distant from the target region by a distance less than a distance threshold as pre-estimated regions corresponding to the target video frame; further determine overlap rates between the pre-estimated regions and the optimal candidate region corresponding to the target video frame; and obtain a pre-estimated region having the highest overlap rate, correct the optimal candidate region corresponding to the target video frame using the pre-estimated region having the highest overlap rate, and determine the corrected optimal candidate region as the target region. It is to be understood that, the corrected optimal candidate region is an image region of the target object corresponding to the target keyword information entry in the target video frame. Therefore, the client terminal may determine the corrected optimal candidate region as the target region.

The target region corresponding to the reference video frame is obtained by correcting an optimal candidate region corresponding to the reference video frame, and the optimal candidate region corresponding to the reference video frame is selected from the reference candidate regions corresponding to the reference video frame based on the regression model.

After obtaining the target region corresponding to the target object (for example, a cat) in the reference video frame, the client terminal may further obtain location information of the target region (that is, center-point location information of the target region (for example, the location information of the target region is Q1)) in the reference video frame, and use the center-point location information of the target region in the reference video frame as first location information. In addition, the client terminal may further obtain location information of the reference candidate regions corresponding to the reference video frame as second location information. It is to be understood that, because the target region corresponding to the reference video frame is obtained by correcting an optimal candidate region corresponding to the reference video frame, and the optimal candidate region corresponding to the reference video frame is selected from the reference candidate regions corresponding to the reference video frame based on the regression model, the target region in the reference video frame may alternatively be understood as a candidate region corresponding to the reference video frame. For example, using a target object in a static state as an example, the target object has the same center-point location information in the target region in the reference video frame and the target region in the target video frame. Therefore, in a process of pre-estimating a region in which the target object is located in the target video frame using the reference video frame, the target region in the reference video frame may be used as a special candidate region.

Figure 9:
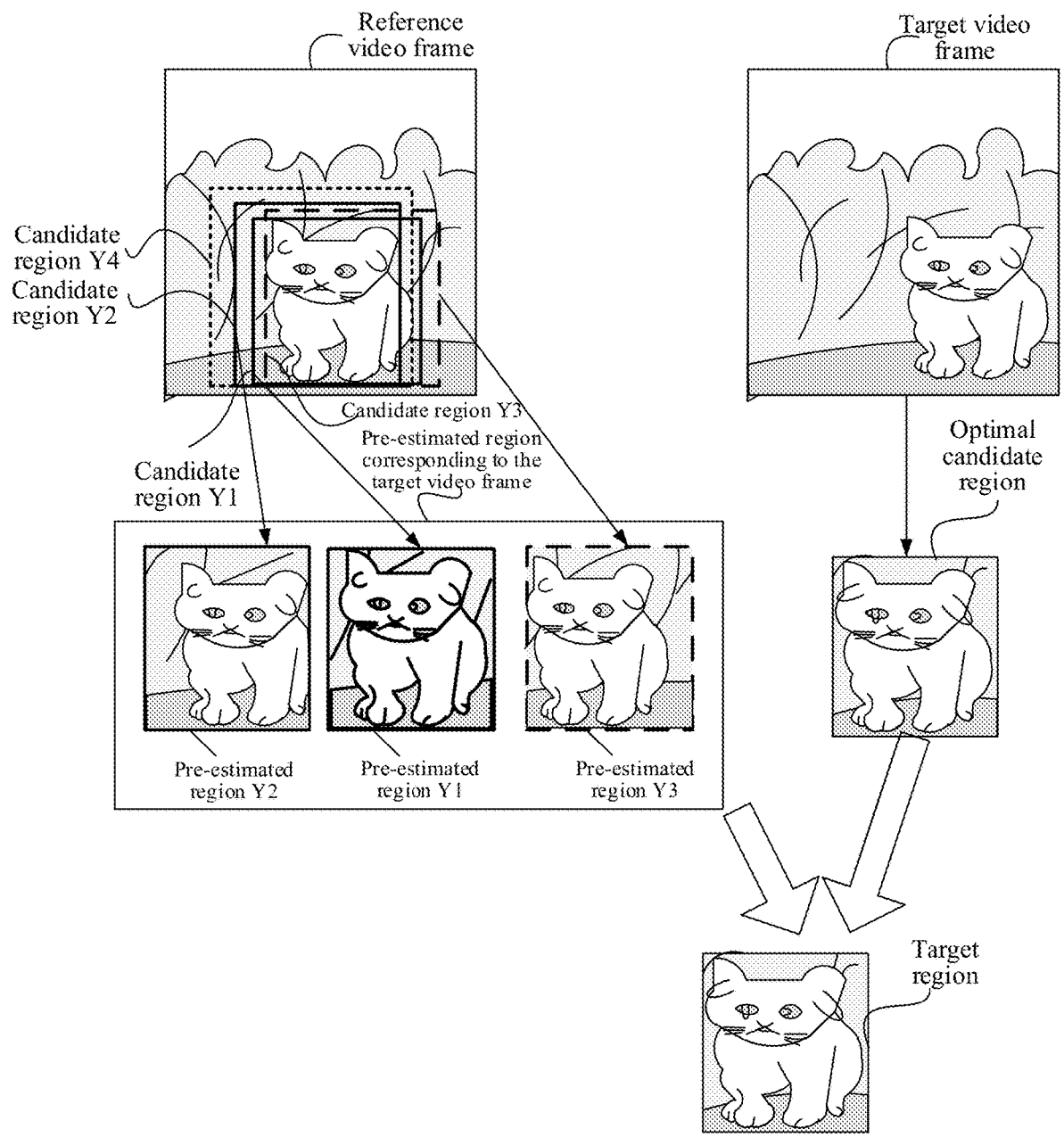
FIG. 9 is a schematic diagram of correcting an optimal video frame of a target video frame according to an embodiment of this application.

Further, FIG. 9 is a schematic diagram of correcting an optimal video frame of a target video frame according to an embodiment of this application. In four candidate regions shown in FIG. 9, a candidate region Y1 is a target region corresponding to the reference video frame. The target region corresponding to the reference video frame is obtained by correcting an optimal candidate region corresponding to the reference video frame, and the optimal candidate region corresponding to the reference video frame is selected from the reference candidate regions corresponding to the reference video frame based on the regression model. Therefore, the client terminal may determine location information of the four candidate regions (that is, the candidate region Y1, a candidate region Y2, a candidate region Y3, and a candidate region Y4 shown in FIG. 9) in the reference video frame. Location information of the candidate region Y1 is location information (that is, Q1) of the target region, location information of the candidate region Y2 is Q2, location information of the candidate region Y3 is Q3, and location information of the candidate region Y4 is Q4. Considering continuity of the target object in adjacent video frames (for example, consistency of a moving track), a region in which the target object appears in a next video frame may be pre-estimated in the reference video frame. That is, in the plurality of reference candidate regions corresponding to the reference video frame, distances between the candidate regions of the reference video frame and the target region may be calculated, and candidate regions which are distant from the target region by a distance less than a distance threshold are used as pre-estimated regions corresponding to the target video frame. Therefore, the client terminal may further calculate a distance (the distance is indicated using a symbol D) between first location information and second location information that correspond to the reference video frame. That is, the client terminal may further calculate a distance D1 (in this case, D1=0) between Q1 and Q1, a distance D2 (for example, D2=0.8) between Q1 and Q2, a distance D3 (for example, D3=0.5) between Q1 and Q3, and a distance D4 (D4=3) between Q1 and Q4. Finally, the client terminal may further use candidate regions which are distant from the target region by a distance less than a distance threshold (for example, the distance threshold is 1) as pre-estimated regions corresponding to the target video frame. That is, in the four candidate regions, a distance between the location information (Q1) of the candidate region Y1 and the location information (Q1) of the target region is less than the distance threshold, a distance between the location information (Q2) of the candidate region Y2 and the location information (Q1) of the target region is less than the distance threshold, and a distance between the location information (Q3) of the candidate region Y3 and the location information (Q1) of the target region is also less than the distance threshold. Therefore, as shown in FIG. 9, the client terminal may use the candidate region Y1, the candidate region Y2, and the candidate region Y3 as pre-estimated regions corresponding to the target video frame.

Further, the client terminal may determine overlap rates between the pre-estimated regions and the optimal candidate region corresponding to the target video frame. Finally, the client terminal may obtain a pre-estimated region having the highest overlap rate, correct the optimal candidate region corresponding to the target video frame using the pre-estimated region having the highest overlap rate, and determine the corrected optimal candidate region as the target region.

The overlap rates may be calculated using the following steps: The client terminal may first obtain a length value and a width value of the optimal candidate region corresponding to the target video frame, and determine, according to the length value and the width value, an area of the optimal candidate region corresponding to the target video frame as a first area. In addition, the client terminal may further obtain length values and width values of the pre-estimated regions, and determine, according to the length values and the width values of the pre-estimated regions and the length value and the width value of the optimal candidate region corresponding to the target video frame, overlapping areas between the pre-estimated regions and the optimal candidate region corresponding to the target video frame as second areas. Then, the client terminal may determine the overlap rates between the pre-estimated regions and the optimal candidate region corresponding to the target video frame according to the first area and the second areas.

Further, after obtaining the pre-estimated regions (that is, the pre-estimated region Y1, the pre-estimated region Y2, and the pre-estimated region Y3) corresponding to the target video frame shown in FIG. 9, the client terminal may respectively calculate, based on an appearance comparison network, overlapping areas between the three pre-estimated regions and the optimal candidate region corresponding to the target video frame as second areas. In addition, an area of the optimal candidate region corresponding to the target video frame is a first area. Therefore, the client terminal may further obtain overlap rates between the pre-estimated regions and the optimal candidate region corresponding to the target video frame according to ratios of the second areas to the first area. An overlap rate between the pre-estimated region Y1 and the optimal candidate region corresponding to the target video frame is 50%, an overlap rate between the pre-estimated region Y2 and the optimal candidate region corresponding to the target video frame is 40%, and an overlap rate between the pre-estimated region Y3 and the optimal candidate region corresponding to the target video frame is 80%. Therefore, the client terminal may use an average of center-point location information of the pre-estimated regions corresponding to the target video frame and center-point location information of the optimal candidate region as center-point location information of the target region of the target video frame.

It can be seen that, overlapping statuses between the pre-estimated regions and the optimal candidate region that correspond to the target video frame may be obtained using the appearance comparison network (that is, the overlap rates between the pre-estimated regions and the optimal candidate region are calculated). Subsequently, the client terminal may alternatively further correct the optimal candidate region corresponding to the target video frame using a pre-estimated region having the highest overlap rate. Certainly, if the overlap rate between the pre-estimated region Y1 and the optimal candidate region corresponding to the target video frame is 100%, it indicates that the target object is in a static state in a plurality of video frames corresponding to the video data. In this case, the target region of the target video frame and the target region of the reference video frame have the same center-point location information. In this case, the target region (that is, an image region of the target object corresponding to the target keyword information entry in the target video frame) may be understood as the optimal candidate region corresponding to the target video frame. Certainly, the target region may be alternatively understood as an image region obtained after the client terminal corrects the optimal candidate region corresponding to the target video frame, that is, the image region is the corrected optimal candidate region.

Step S208. Perform animation processing on the target region in the target video frame in a case that the target video frame in the video data is played.

For a specific implementation process of step S208, reference may be made to the description of step S104 in the embodiment corresponding to FIG. 2, and details are not described herein again.

It can be seen that, in this embodiment of this application, during a process of playing the video data, the video data corresponding to the bullet comment data may be split into a plurality of video frames, and the target object corresponding to the target keyword information entry in the currently played video data may be recognized. In this case, the client terminal may convert detection on the target object in the video data into detection on the target object in all the video frames one by one. If the target object corresponding to the target keyword information entry exists in all the video frames of the video data, target regions of the target object in all the video frames may be further determined. Therefore, an animation effect may be further set for each target region, so that when a video frame is played, the animation effect of the target region may be correspondingly displayed. It can be seen that, by associating target keyword information entry in the bullet comment data with the target object located in the target region in the target video frame, a visual display effect of the bullet comment data may be enriched. Therefore, it may be ensured that a user watching the video data may effectively capture video content in which the user is interested through the specified keyword information entry, thereby avoiding waste of device resources and network resources caused by recognizing and capturing the bullet comment data.

For example, recorded video data is that a person is running. A user may see a moving track of the person on a playback interface corresponding to the video data using a client terminal. That is, video frames are played in chronological order, so that after obtaining target regions of all the video frames, the client terminal may sequentially perform animation display of the target regions in the video frames, to ensure that the user holding the client terminal can see animation display effects corresponding to all the target regions on the playback interface of the video data, that is, the user may see the moving track of the person on the playback interface.

In this embodiment of this application, after bullet comment data in a process of playing the video data is obtained, all key content (that is, all keyword information entry) in the bullet comment data may be further extracted based on a key information library. In addition, a target object corresponding to a target video frame in a plurality of video frames of the video data may be recognized using a classification recognition model of a target object corresponding to each piece of keyword information entry, a specific location of the target object in the target video frame (that is, a target region of the target object in the target video frame) may be further determined, and animation display of the target region is performed. Therefore, by associating keyword information entry in the bullet comment data with the target object located in the target region in the target video frame, a visual display effect of the bullet comment data may be enriched.

Figure 10:
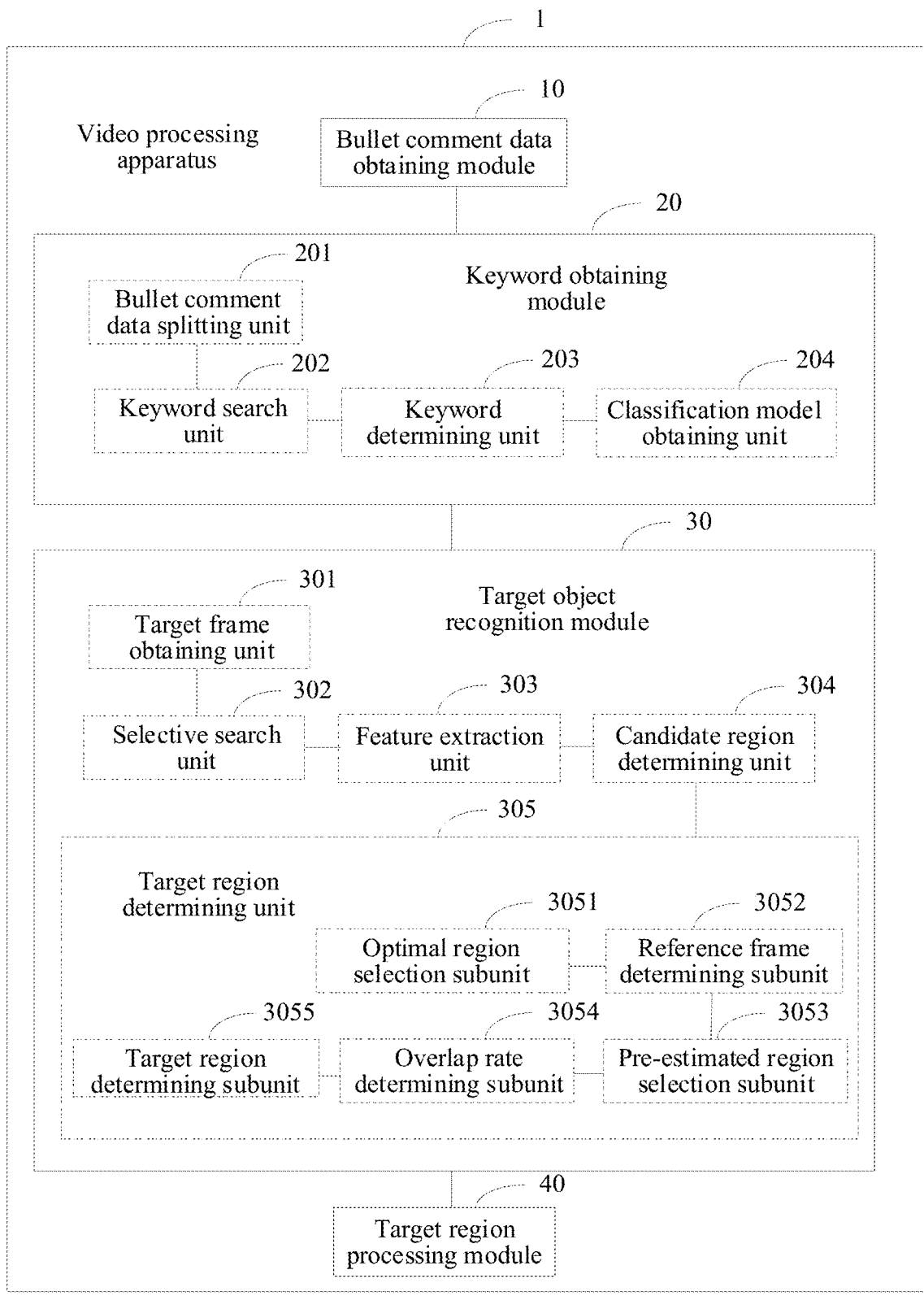
FIG. 10 is a schematic structural diagram of a video processing apparatus according to an embodiment of this application.

Further, FIG. 10 is a schematic structural diagram of a video processing apparatus according to an embodiment of this application. As shown in FIG. 10, the video processing apparatus 1 may be the target client terminal in the embodiment corresponding to FIG. 1. The video processing apparatus 1 may include: a bullet comment data obtaining module 10, a keyword obtaining module 20, a target object recognition module 30, and a target region processing module 40.

The bullet comment data obtaining module 10 is configured to play video data, and obtain bullet comment data corresponding to the video data.

The bullet comment data obtaining module 10 is specifically configured to play the video data, transmit a bullet comment obtaining request to a bullet comment server, receive historical bullet comment data returned by the bullet comment server based on the bullet comment obtaining request, use the historical bullet comment data as the bullet comment data corresponding to the video data, and display the bullet comment data on a playback interface of the video data.

Optionally, the bullet comment data obtaining module 10 is specifically configured to play the video data, obtain text input data, use the text input data as the bullet comment data corresponding to the video data, display the bullet comment data on a playback interface of the video data based on a bullet comment track, and transmit the bullet comment data to a bullet comment server, so that the bullet comment server synchronously transmits the bullet comment data to a client terminal playing the video data.

The keyword obtaining module 20 is configured to obtain keyword information entry matching the bullet comment data from a key information library as target keyword information entry, the key information library including keyword information entry set by a user and a classification recognition model of a target object corresponding to each piece of keyword information entry.

The keyword obtaining module 20 includes: a bullet comment data splitting unit 201, a keyword search unit 202, a keyword determining unit 203, and a classification model obtaining unit 204.

The bullet comment data splitting unit 201 is configured to obtain the key information library, and split the bullet comment data into a plurality of component word entries.

The keyword search unit 202 is configured to traverse the key information library to search for keyword information entry matching each of component word entries.

The keyword determining unit 203 is configured to use, in a case that the keyword information entry matching the component word entry is found, the keyword information entry as target keyword information entry corresponding to the bullet comment data.

The classification model obtaining unit 204 is configured to obtain a classification recognition model of a target object corresponding to the target keyword information entry from the key information library.

For a specific implementation process of the bullet comment data splitting unit 201, the keyword search unit 202, the keyword determining unit 203, and the classification model obtaining unit 204, reference may be made to the description of step S102 in the embodiment corresponding to FIG. 2, and details are not described herein again.

The target object recognition module 30 is configured to obtain a target video frame from a plurality of video frames of the video data, recognize an image region of a target object corresponding to the target keyword information entry in the target video frame based on a classification recognition model corresponding to the target keyword information entry, and use the recognized image region as a target region.

The target object recognition module 30 includes: a target frame obtaining unit 301, a selective search unit 302, a feature extraction unit 303, and a candidate region determining unit 304, and a target region determining unit 305.

The target frame obtaining unit 301 is configured to obtain the target video frame from the plurality of video frames of the video data.

The selective search unit 302 is configured to divide the target video frame into a plurality of sub-regions, perform a selective search on the plurality of sub-regions, combine sub-regions obtained after the selective search to obtain a plurality of combined regions, and determine all the plurality of sub-regions and the plurality of combined regions as to-be-processed regions.

The feature extraction unit 303 is configured to perform feature extraction on the to-be-processed regions based on a neural network model, to obtain image features corresponding to the to-be-processed regions.

Specifically, the feature extraction unit 303 is configured to scale image blocks in the to-be-processed regions to the same sizes, use the to-be-processed regions having the same sizes as inputs of the neural network model, and output image features corresponding to the image blocks in the to-be-processed regions using the neural network model.

The candidate region determining unit 304 is configured to generate recognition probabilities corresponding to the to-be-processed regions based on the image features and the classification recognition model corresponding to the target keyword information entry, and select, according to the recognition probabilities, candidate regions including the target object corresponding to the target keyword information entry from the to-be-processed regions.

The recognition probabilities are used for representing probabilities that the to-be-processed regions include the target object.

The target region determining unit 305 is configured to perform optimal selection on the candidate regions corresponding to the target video frame based on a regression model, and determine a selected optimal candidate region corresponding to the target video frame as the target region.

The target region determining unit 305 includes: an optimal region selection subunit 3051, a reference frame determining subunit 3052, a pre-estimated region selection subunit 3053, an overlap rate determining subunit 3054, and a target region determining subunit 3055.

The optimal region selection subunit 3051 is configured to perform optimal selection on the candidate regions corresponding to the target video frame based on a regression model, and select an optimal candidate region corresponding to the target video frame from the candidate regions.

The reference frame determining subunit 3052 is configured to determine a previous video frame of the target video frame as a reference video frame, and obtaining a plurality of reference candidate regions corresponding to the reference video frame, the plurality of reference candidate regions corresponding to the reference video frame being selected from to-be-processed regions corresponding to the reference video frame using the classification recognition model corresponding to the target keyword information entry, and the to-be-processed regions corresponding to the reference video frame being generated by performing a selective search on the reference video frame.

The pre-estimated region selection subunit 3053 is configured to select pre-estimated regions from the plurality of reference candidate regions corresponding to the reference video frame.

Specifically, the pre-estimated region selection subunit 3053 is configured to obtain a target region of the target object in the reference video frame; obtain location information of the target region in the reference video frame as first location information, and obtain location information of the reference candidate regions corresponding to the reference video frame as second location information; calculate a distance between the first location information and the second location information corresponding to the reference video frame, and use candidate regions which are distant from the target region by a distance less than a distance threshold as pre-estimated regions corresponding to the target video frame.

The target region corresponding to the reference video frame is obtained by correcting an optimal candidate region corresponding to the reference video frame, and the optimal candidate region corresponding to the reference video frame is selected from the reference candidate regions corresponding to the reference video frame based on the regression model.

The overlap rate determining subunit 3054 is configured to determine overlap rates between the pre-estimated regions and the optimal candidate region corresponding to the target video frame.

Specifically, the overlap rate determining subunit 3054 is configured to obtain a length value and a width value of the optimal candidate region corresponding to the target video frame, and determine, according to the length value and the width value, an area of the optimal candidate region corresponding to the target video frame as a first area; obtain length values and width values of the pre-estimated regions, and determine, according to the length values and the width values of the pre-estimated regions and the length value and the width value of the optimal candidate region corresponding to the target video frame, overlapping areas between the pre-estimated regions and the optimal candidate region corresponding to the target video frame as second areas; and determine the overlap rates between the pre-estimated regions and the optimal candidate region corresponding to the target video frame according to the first area and the second areas.

The target region determining subunit 3055 is configured to obtain a pre-estimated region having the highest overlap rate, correct the optimal candidate region corresponding to the target video frame using the pre-estimated region having the highest overlap rate, and determine the corrected optimal candidate region as the target region.

For specific implementation processes of the optimal region selection subunit 3051, the reference frame determining subunit 3052, the pre-estimated region selection subunit 3053, the overlap rate determining subunit 3054, and the target region determining subunit 3055, reference may be made to the description of step S207 in the embodiment corresponding to FIG. 5, and details are not described herein again.

For specific implementation processes of the target frame obtaining unit 301, the selective search unit 302, the feature extraction unit 303, and the candidate region determining unit 304, and the target region determining unit 305, reference may be made to the descriptions of step S203 to step S207 in the embodiment corresponding to FIG. 5, and details are not described herein again.

The target region processing module 40 is configured to perform animation processing on the target region in the target video frame in a case that the target video frame in the video data is played.

For a specific implementation process of the bullet comment data obtaining module 10, the keyword obtaining module 20, the target object recognition module 30, and the target region processing module 40, reference may be made to the descriptions of step S101 to step S104 in the embodiment corresponding to FIG. 2, and details are not described herein again.

In this embodiment of this application, after bullet comment data in a process of playing the video data is obtained, all key content (that is, all keyword information entry) in the bullet comment data may be further extracted based on a key information library. In addition, a target object corresponding to a target video frame in a plurality of video frames of the video data may be recognized using a classification recognition model of a target object corresponding to each piece of keyword information entry, a specific location of the target object in the target video frame (that is, a target region of the target object in the target video frame) may be further determined, and animation display of the target region is performed. Therefore, by associating keyword information entry in the bullet comment data with the target object located in the target region in the target video frame, a visual display effect of the bullet comment data may be enriched.

Figure 11:
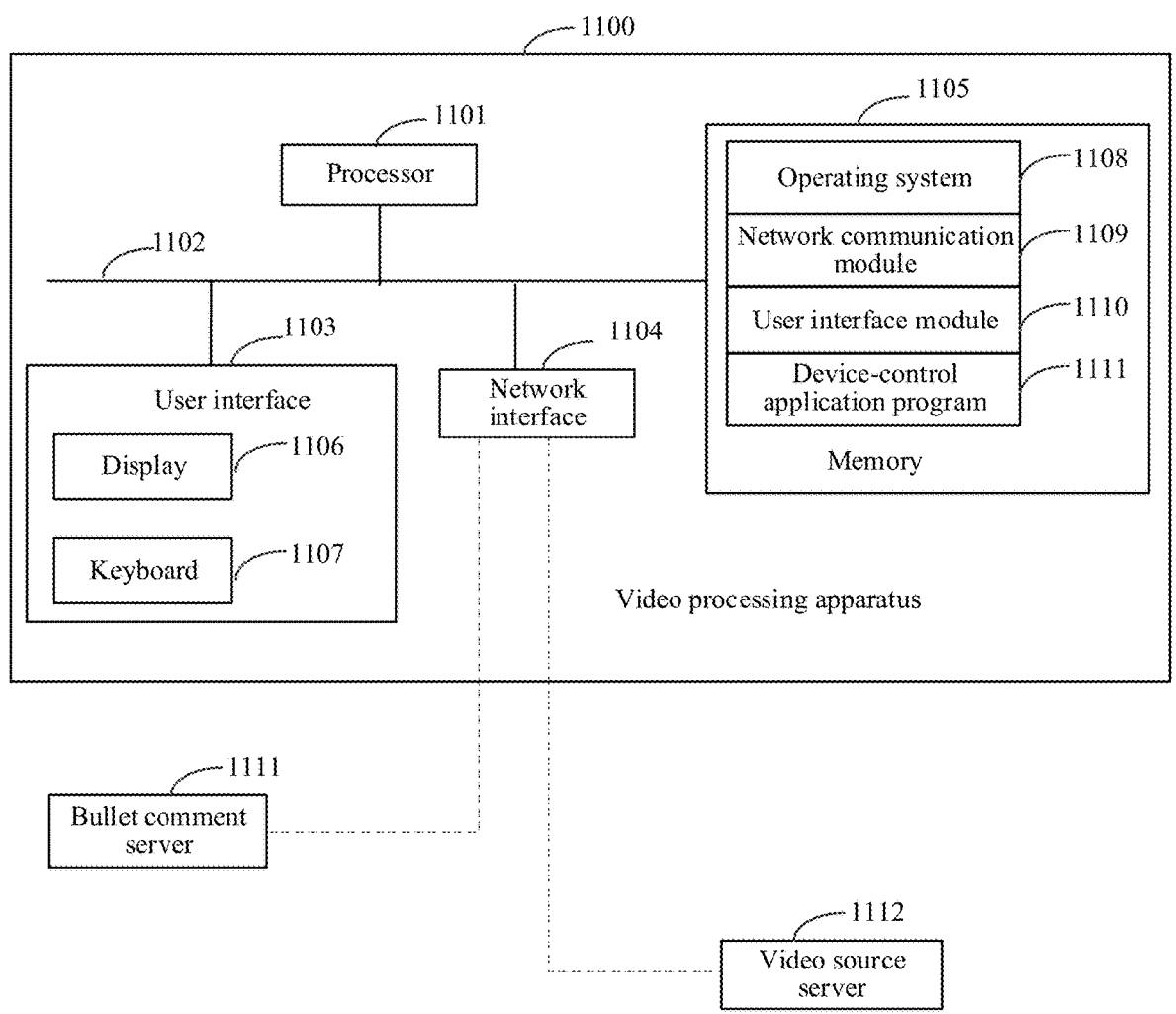
FIG. 11 is a schematic structural diagram of another video processing apparatus according to an embodiment of this application.

Further, FIG. 11 is a schematic structural diagram of another video processing apparatus according to an embodiment of this application. As shown in FIG. 11, the video processing apparatus 1100 may be the target client terminal in the embodiment corresponding to FIG. 1. The video processing apparatus 1100 may include: at least one processor 1101, for example, a CPU, at least one network interface 1104, a user interface 1103, a memory 1105, and at least one communications bus 1102. The communications bus 1102 is configured to implement connection and communication between the components. The user interface 1103 may include a display 1106 and a keyboard 1107. Optionally, the user interface 1103 may further include a standard wired interface and a standard wireless interface. Optionally, the network interface 1104 may include a standard wired interface and a standard wireless interface (such as a Wi-Fi interface). The memory 1105 may be a high-speed RAM memory, or may be a non-volatile memory, for example, at least one magnetic disk memory. Optionally, the memory 1105 may alternatively be at least one storage apparatus away from the processor 1101. As shown in FIG. 11, the memory 1105 used as a computer storage medium may include an operating system 1108, a network communication module 1109, a user interface module 1110, and a device-control application program 1111.

In the video processing apparatus 1100 shown in FIG. 11, the network interface 1104 is mainly configured to connect a bullet comment server 1111 and a video source server 1112. The user interface 1103 is mainly configured to provide an input interface for a user. The processor 1101 may be configured to invoke the device-control application program stored in the memory 1105, to implement:

playing video data, and obtaining bullet comment data corresponding to the video data;

obtaining keyword information entry matching the bullet comment data from a key information library as target keyword information entry, the key information library including keyword information entry set by a user and a classification recognition model of a target object corresponding to each piece of keyword information entry;

obtaining a target video frame from a plurality of video frames of the video data, and recognizing, based on a classification recognition model corresponding to the target keyword information entry, an image region of a target object corresponding to the target keyword information entry in the target video frame as a target region; and performing animation processing on the target region in the target video frame in a case that the target video frame in the video data is played.

It is to be understood that the video processing apparatus 1100 described in this embodiment of this application may perform the descriptions of the video processing method in the embodiment corresponding to FIG. 2 or FIG. 5, or may perform the descriptions of the video processing apparatus 1 in the embodiment corresponding to FIG. 10, and details are not described herein again. In addition, beneficial effects achieved using the same method are not described herein again.

In addition, an embodiment of this application further provides a computer storage medium. The computer storage medium stores a computer program executed by the video processing apparatus 1 mentioned above, and the computer program includes a program instruction. When executing the program instruction, the processor can perform the descriptions of the video processing method in the embodiment corresponding to FIG. 2 or FIG. 5. Therefore, details are not described herein again. In addition, beneficial effects achieved using the same method are not described herein again. For technical details that are not disclosed in the embodiment of the computer storage medium included in this application, refer to descriptions of the method embodiments of this application.

A person of ordinary skill in the art may understand that all or some of the processes of the methods in the embodiments may be implemented by a computer program instructing relevant hardware. The program may be stored in a computer-readable storage medium. When the program is run, the program may include processes of the methods in the embodiments. The storage medium may be a magnetic disk, an optical disc, a read-only memory (ROM), a random access memory (RAM), or the like.

The foregoing disclosure is merely exemplary embodiments of this application, and certainly is not intended to limit the protection scope of this application. Therefore, equivalent variations made in accordance with the claims of this application shall fall within the scope of this application.

What is claimed is:

1. A video processing method, performed by a client terminal, the method comprising: transmitting a bullet comment obtaining request to a bullet comment server; receiving historical bullet comment data from the bullet comment server based on the bullet comment obtaining request; using the historical bullet comment data as the bullet comment data corresponding to a video data; displaying the bullet comment data on a playback interface of the video data; obtaining keyword information entry matching the bullet comment data from a key information library as target keyword information entry, the key information library comprising keyword information entries and classification recognition models of target objects respectively corresponding to each of the keyword information entries; obtaining a target video frame from a plurality of video frames of the video data; recognizing an image region of a target object corresponding to the target keyword information entry in the target video frame based on a classification recognition model of the target object; designating the recognized image region as a target region; and performing animation processing on the target region in the target video frame in response to the target video frame in the video data being played.

2. The method of claim 1, wherein obtaining the keyword information entry comprises:
splitting the bullet comment data into a plurality of component word entries;
traversing the key information library to search for keyword information entries respectively matching each of the component word entries;
in response to finding a keyword information entry matching one of the component word entries, using the keyword information entry as target keyword information entry corresponding to the bullet comment data; and
obtaining a classification recognition model of a target object corresponding to the target keyword information entry from the key information library.

3. The method of claim 2, wherein recognizing an image region of a target object corresponding to the target keyword information entry in the target video frame comprises:
obtaining the target video frame from the plurality of video frames of the video data;
dividing the target video frame into a plurality of sub-regions;

performing a selective search on the plurality of sub-regions to obtain searched sub-regions;

combining the searched sub-regions to obtain a plurality of combined regions, and designating the plurality of sub-regions and the plurality of combined regions as to-be-processed regions;

performing feature extraction on the to-be-processed regions based on a neural network model, to obtain image features corresponding to the to-be-processed regions;

generating recognition probabilities corresponding to the to-be-processed regions based on the image features and the classification recognition model of the target object corresponding to the target keyword information entry, the recognition probabilities indicating probabilities that the to-be-processed regions comprise the target object;

selecting, according to the recognition probabilities, candidate regions comprising the target object from the to-be-processed regions;

respectively calculating, using a regression model, normalized distances between the target object in the candidate regions and candidate borders of the candidate regions in which the target object is located, selecting a candidate region having a normalized distance that satisfies a predetermined condition as an optimal candidate region corresponding to the target video frame;

determining the optimal candidate region as the target region.

4. The method of claim 3, wherein the predetermined condition is that a normalized distance between the target object and a candidate border of a candidate region in which the target object is located is a shortest among the normalized distances.

5. The method of claim 3, wherein the predetermined condition is that a normalized distance between the target object and a candidate border of a candidate region in which the target object is located is a longest among the normalized distances.

6. The method of claim 3, wherein performing the feature extraction on the to-be-processed regions based on the neural network model to obtain the image features corresponding to the to-be-processed regions comprises:

scaling image blocks in the to-be-processed regions to a same size;

using the to-be-processed regions as inputs of the neural network model; and outputting the image features corresponding to the image blocks in the to-be-processed regions using the neural network model.

7. The method of claim 3, wherein determining the optimal candidate region as the target region comprises:

determining a previous video frame of the target video frame as a reference video frame;

obtaining a plurality of reference candidate regions corresponding to the reference video frame;

selecting pre-estimated regions from the plurality of reference candidate regions corresponding to the reference video frame;

determining overlap rates between the pre-estimated regions and the optimal candidate region corresponding to the target video frame;

obtaining a pre-estimated region having a highest overlap rate among the pre-estimated regions;

correcting the optimal candidate region corresponding to the target video frame using the pre-estimated region having the highest overlap rate; and determining the corrected optimal candidate region as the target region.

8. The method of claim 7, wherein obtaining the plurality of reference candidate regions corresponding to the reference video frame comprises:

performing a selective search on the reference video frame to generate to-be-processed regions corresponding to the reference video frame; and selecting the plurality of reference candidate regions from the to-be-processed regions corresponding to the reference video frame using the classification recognition model corresponding to the target keyword information entry.

9. The method of claim 7, wherein selecting the pre-estimated regions from the plurality of reference candidate regions corresponding to the reference video frame comprises:

obtaining a reference target region of the target object in the reference video frame;

obtaining location information of the reference target region in the reference video frame as first location entry;

obtaining respective location information of the reference candidate regions corresponding to the reference video frame as second location entries;

calculating distances between the first location entry and the second location entries; and selecting reference candidate regions having distances from the target region that are less than a distance threshold as pre-estimated regions corresponding to the target video frame.

10. The method of claim 9, wherein obtaining the reference target region of the target object in the reference video frame comprises:

selecting reference optimal candidate region corresponding to the reference video frame from the reference candidate regions corresponding to the reference video frame based on the regression model; and correcting the reference optimal candidate region to obtain the reference target region.

11. The method of claim 10, wherein determining the overlap rates between the pre-estimated regions and the optimal candidate region corresponding to the target video frame comprises:

obtaining a length value and a width value of the optimal candidate region corresponding to the target video frame;

determining, according to the length value and the width value, an area of the optimal candidate region corresponding to the target video frame as a first area;

obtaining length values and width values of the pre-estimated regions;

determining, according to the length values and the width values of the pre-estimated regions and the length value and the width value of the optimal candidate region corresponding to the target video frame, overlapping areas between the pre-estimated regions and the optimal candidate region corresponding to the target video frame as second areas; and determining the overlap rates between the pre-estimated regions and the optimal candidate region corresponding to the target video frame based on the first area and the second areas.

12. The method of claim 1, wherein obtaining the bullet comment data corresponding to the video data comprises:
obtaining text input data;
using the text input data as the bullet comment data corresponding to the video data; and
displaying the bullet comment data on a playback interface of the video data based on a bullet comment track.

13. The method of claim 12, further comprising:
transmitting the bullet comment data to a bullet comment server, wherein the bullet comment server synchronously transmits the bullet comment data to a client terminal through which the video data is viewed.

14. A video processing apparatus, comprising: a memory operable to store program code; and a processor operable to read the program code and configured to: transmit a bullet comment obtaining request to a bullet comment server; receive historical bullet comment data from the bullet comment server based on the bullet comment obtaining request; use the historical bullet comment data as the bullet comment data corresponding to a video data; display the bullet comment data on a playback interface of the video data; obtain keyword information entry matching the bullet comment data from a key information library as target keyword information entry, the key information library comprising keyword information entry and classification recognition models of target objects respectively corresponding to each of the keyword information entries; obtain a target video frame from a plurality of video frames of the video data; recognize an image region of a target object corresponding to the target keyword information entry in the target video frame based on a classification recognition model of the target object; determine the recognized image region as a target region; and perform animation processing on the target region in the target video frame in response to the target video frame in the video data being played.

15. The apparatus of claim 14, wherein the processor is further configured to:
split the bullet comment data into a plurality of component word entries;
traverse the key information library to search for keyword information entries respectively matching each of the component word entries;
in response to finding a keyword information entry matching one of the component word entries, use the keyword information entry as target keyword information entry corresponding to the bullet comment data; and
obtain a classification recognition model of a target object corresponding to the target keyword information entry from the key information library.

16. The apparatus of claim 15, wherein the process is further configured to:
obtain the target video frame from the plurality of video frames of the video data;
divide the target video frame into a plurality of sub-regions;
perform a selective search on the plurality of sub-regions to obtain searched sub-regions;
combine the searched sub-regions to obtain a plurality of combined regions;
determine the plurality of sub-regions and the plurality of combined regions as to-be-processed regions;
perform feature extraction on the to-be-processed regions based on a neural network model, to obtain image features corresponding to the to-be-processed regions;
generate recognition probabilities corresponding to the to-be-processed regions based on the image features and the classification recognition model of the target object corresponding to the target keyword information entry, the recognition probabilities indicate probabilities that the to-be-processed regions comprise the target object;
select, according to the recognition probabilities, candidate regions comprising the target object from the to-be-processed regions;
respectively calculate, using a regression model, normalized distances between the target object in the candidate regions and candidate borders of the candidate regions in which the target object is located,
select a candidate region in which the normalized distance satisfies a predetermined condition as an optimal candidate region corresponding to the target video frame;
determine the optimal candidate region as the target region.

17. The apparatus of claim 16, wherein the processor is further configured to:
scale image blocks in the to-be-processed regions to a same size;
use the to-be-processed regions as inputs of the neural network model; and
output the image features corresponding to the image blocks in the to-be-processed regions using the neural network model.

18. The apparatus of claim 16, wherein the processor is further configured to:
determine a previous video frame of the target video frame as a reference video frame;
obtain a plurality of reference candidate regions corresponding to the reference video frame;
select pre-estimated regions from the plurality of reference candidate regions corresponding to the reference video frame;
determine overlap rates between the pre-estimated regions and the optimal candidate region corresponding to the target video frame;
obtain a pre-estimated region having the highest overlap rate among the pre-estimated regions;
correct the optimal candidate region corresponding to the target video frame using the pre-estimated region having the highest overlap rate; and
determine the corrected optimal candidate region as the target region.

19. A non-transitory computer-readable storage medium, having processor executable instructions stored thereon for causing a processor to: transmit a bullet comment obtaining request to a bullet comment server; receive historical bullet comment data from the bullet comment server based on the bullet comment obtaining request; use the historical bullet comment data as the bullet comment data corresponding to a video data; display the bullet comment data on a playback interface of the video data; obtain keyword information entry matching the bullet comment data from a key information library as target keyword information entry, the key information library comprising keyword information entry and classification recognition models of target objects respectively corresponding to each of the keyword information entries; obtain a target video frame from a plurality of video frames of the video data; recognize an image region of a target object corresponding to the target keyword information entry in the target video frame based on a classification recognition model of the target object; determine the recognized image region as a target region; and perform animation processing on the target region in the target video frame in response to the target video frame in the video data being played.

* * * * *